United States Patent
Oikawa et al.

(10) Patent No.: US 8,397,759 B2
(45) Date of Patent: Mar. 19, 2013

(54) ELECTROMAGNETIC SPOOL VALVE

(75) Inventors: Naoki Oikawa, Miyagi (JP); Shigeto Ryuen, Sendai (JP); Hiroyuki Kato, Miyagi (JP)

(73) Assignee: Keihin Corporation, Tokyo (JP)

( * ) Notice: Subject to any disclaimer, the term of this patent is extended or adjusted under 35 U.S.C. 154(b) by 989 days.

(21) Appl. No.: 12/380,428

(22) Filed: Feb. 27, 2009

(65) Prior Publication Data
US 2009/0224192 A1 Sep. 10, 2009

(30) Foreign Application Priority Data

Mar. 4, 2008 (JP) ................................ 2008-053604
Mar. 25, 2008 (JP) ................................ 2008-078164
Apr. 17, 2008 (JP) ................................ 2008-107587
May 27, 2008 (JP) ................................ 2008-138274

(51) Int. Cl.
*F16K 11/07* (2006.01)
(52) U.S. Cl. ........... 137/625.68; 137/630.22; 137/596.2; 251/129.19
(58) Field of Classification Search ................ 137/628, 137/630.19, 630.16, 625.12, 184, 614.19, 137/614.11, 614.14, 596.16, 596.2, 625.67, 137/625.68, 596, 6, 30.22; 251/129.19
See application file for complete search history.

(56) References Cited

U.S. PATENT DOCUMENTS

| | | | | | |
|---|---|---|---|---|---|
| 4,313,590 | A | * | 2/1982 | Nishimiya | ............... 251/129.08 |
| 4,860,792 | A | * | 8/1989 | Ichihashi et al. | ......... 137/596.17 |
| 4,924,902 | A | * | 5/1990 | Lewis et al. | ............. 137/596.16 |
| 5,199,313 | A | * | 4/1993 | Muller | ..................... 137/596.16 |
| 6,036,447 | A | * | 3/2000 | Kawaguchi et al. | ..... 251/129.15 |
| 6,619,183 | B2 | * | 9/2003 | Yoshino | ................... 137/596.16 |
| 7,503,347 | B2 | * | 3/2009 | Ryuen et al. | ............. 137/625.69 |
| 7,909,060 | B2 | | 3/2011 | Yamamoto et al. | |

FOREIGN PATENT DOCUMENTS

| | | |
|---|---|---|
| JP | 2005-155893 A | 6/2005 |
| JP | 2005-286236 | 10/2005 |

* cited by examiner

*Primary Examiner* — Craig Schneider
*Assistant Examiner* — Craig J Price
(74) *Attorney, Agent, or Firm* — Carrier Blackman & Associates, P.C.; Joseph P. Carrier; William D. Blackman

(57) ABSTRACT

The electromagnetic spool valve of the present invention includes a movable linear solenoid section, first and second spools that are coaxially provided in inner space of a valve body so as to switch a state of communication and discommunication among plural ports of the electromagnetic spool valve, a first spring member provided between the first and second spools, and a second spring member provided between a cap member and the second spool. The spring load of the second spring member is set to be greater than the spring load of the first spring member.

4 Claims, 19 Drawing Sheets

LINEAR SOLENOID SECTION IN OFF STATE

FIRST LIFT STATE (d1<d2)

(d1 < d2)

ELECTROMAGNETIC SPOOL VALVE

This application claims the foreign priority benefit under 35 U.S.C. §119 of Japanese Patent Applications No. 2008-053604 filed on Mar. 4, 2008, No. 2008-078164 filed on Mar. 25, 2008, No. 2008-107587 filed on Apr. 17, 2008, and No. 2008-138274 filed on May 27, 2008, the disclosures of which are incorporated herein by reference.

BACKGROUND OF THE INVENTION

1. Field of the Invention

The present invention relates to an electromagnetic spool valve system including a linear solenoid section and a spool section.

2. Description of the Related Art

A conventional electromagnetic spool valve is usually constituted by a spool valve having an approximately cylindrical outer shape and a solenoid section functioning as an electromagnetic actuator to actuate the spool valve.

As for such an electromagnetic spool valve, the present applicant has provided a linear solenoid valve that realizes significant enhancement of magnetic attractive force to a movable core, as disclosed in JP 2005-286236 A, for example.

In such a linear solenoid valve disclosed in JP 2005-286236 A, there are provided an inlet port and an outlet port on an outer circumference of a cylindrical valve body, and also a single spool within the valve body, which moves along the axial direction so as to switch a state of communication and discommunication between the inlet and outlet ports.

The linear solenoid valve disclosed in JP 2005-286236 A, in response to control signals from the controller, controls the solenoid section (coil) to be in off state (i.e. current supplied state) or in on-state (i.e. non-current supplied state) using duty ratio control, so as to provide a two-state (communication and discommunication) switching control between the inlet and outlet ports, which allows the two-state switching control on hydraulic pressure.

In this case, the linear solenoid valve disclosed in JP 2005-286236 A provides the above-mentioned two-state switching control for the hydraulic pressure led out of the outlet port by sliding the single spool. However, multi-state switching control for hydraulic pressure in a more accurate way has been desired.

In addition, it has been desired that, even in the multi-state switching control for hydraulic pressure carried out by using multiple spools, spool-operating delay is reduced to as small as possible at the time of state-switching control for the hydraulic pressure, so as to enhance the valve-operational responsiveness.

SUMMARY OF THE INVENTION

Thus, the present invention has a general object to provide an electromagnetic spool valve that realizes a three-state switching control with high accuracy for pressure fluid by using plural spools.

The present invention has further a main object to provide an electromagnetic spool valve that enhances valve-operational responsiveness at the time of the state-switching control.

The present invention has another object to provide an electromagnetic spool valve that can be assembled more easily.

Yet, the present invention has another object to provide an electromagnetic spool valve that having more outlet ports, so as to provided an electromagnetic spool valve that enhance general-purpose property.

In one aspect of the present invention, there is provided an electromagnetic spool valve including a main body including a valve body having plural ports through which pressure fluid flows in and out and a housing; a linear solenoid section including a coil wound around a coil bobbin, a fixed core, and a movable core that is attracted toward the fixed core when electric current is supplied for the coil, each installed in the housing; and a valve operating mechanism including a first spool and a second spool coaxially provided in inner space of the valve body so as to switch a state of communication and discommunication among the plural ports. The valve operation mechanism is provided with a first spring member between the first and second spools, and with a second spring member between one end of the valve body and the second spool such that a spring load of the second spring member is set to be greater than a spring load of the first spring member.

In another aspect of the present invention, there is provided an electromagnetic spool valve including a main body including a valve body having plural ports through which pressure fluid flows in and out and a housing; a linear solenoid section including a coil wound around a coil bobbin, a fixed core, and a movable core that is attracted toward the fixed core when electric current is supplied for the coil, each installed in the housing; a valve operating mechanism including a first spool and a second spool coaxially provided in inner space of the valve body so as to switch a state of communication and discommunication among the plural ports; and a first spring member provided between the first and second spools, and a second spring member provided between one end of the valve body and the second spool. The second spool has a maximum outer diameter in approximately cylindrical shape, which is greater than a maximum outer diameter in approximately cylindrical shape of the first spool; and an annular stopper where one end of the second spool comes in contact and abuts being provided around an inner wall face of the valve body.

Yet in another aspect of the present invention, there is provided an electromagnetic spool valve including a main body including a valve body having plural ports through which pressure fluid flows in and out and a housing; a linear solenoid section including a coil wound around a coil bobbin, a fixed core, and a movable core that is attracted toward the fixed core when electric current is supplied for the coil, each installed in the housing; a valve operating mechanism including a first spool and a second spool coaxially provided in inner space of the valve body so as to switch a state of communication and discommunication among the plural ports; a first spring member provided between the first and second spools, and a second spring member provided between one end of the valve body and the second spool. The switching a state of communication and discommunication among the plural ports is carried out by a three-state switching control including: a valve-initial state with small electric current supplied for the linear solenoid section in an off state with no electric current supplied; a first lift state with moderate electric current greater than the small electric current supplied for the linear solenoid section, so as to let the movable core positioned at an intermediate position; and a second lift state with great electric current greater than the moderate electric current supplied for the linear solenoid section, so as to let the movable core positioned at a displacement terminal position.

Yet in another aspect of the present invention, there is provided an electromagnetic spool valve including: a main body including a valve body having plural ports through which pressure fluid flows in and out and a housing; a linear solenoid section including a coil wound around a coil bobbin, a fixed core, and a movable core that is attracted toward the fixed core when electric current is supplied for the coil, each installed in the housing; a valve operating mechanism including a first spool and a second spool coaxially provided in inner space of the valve body so as to switch a state of communication and discommunication among the plural ports based on a positional relation between the first and the second spools; a first spring member provided between the first and second spools, and a second spring member provided between one end of the valve body and the second spool. The switching a state of communication and discommunication among the plural ports being carried out by a three-state switching control including: a valve-initial state with small electric current supplied for the linear solenoid section in an off state with no electric current supplied; a first lift state with moderate electric current greater than the small electric current supplied for the linear solenoid section, so as to let the movable core positioned at an intermediate position; and a second lift state with great electric current greater than the moderate electric current supplied for the linear solenoid section, so as to let the movable core positioned at a displacement terminal position. In the off state and the valve-initial state of the linear solenoid section, the first and the second spools are positioned such that the spring force of the first spring member sets the first and the second spools out of contact but partially overlapped with each other along the axial direction, in the first lift state of the linear solenoid section, the first and the second spools are positioned such that the first spool is displaced toward the second spool while resisting the spring force of the first spring member, and the first and the second spools are in contact with each other, and in the second lift state of the linear solenoid section, the first and the second spools are positioned such that, with the first and the second spools retained in contact with each other, the first spool is displaced at a predetermined distance toward one end of the valve body while resisting the spring force of the second spring member.

Yet in another aspect of the present invention, there is provided an electromagnetic spool valve including: a main body including a valve body having plural ports through which pressure fluid flows in and out and a housing; a linear solenoid section including a coil wound around a coil bobbin, a fixed core, and a movable core that is attracted toward the fixed core when electric current is supplied for the coil, each installed in the housing; a valve operating mechanism including a first spool and a second spool coaxially provided in inner space of the valve body so as to switch a state of communication and discommunication among the plural ports; a first spring member provided between the first and second spools, and a second spring member provided between one end of the valve body and the second spool. The plural ports includes first to fourth outlet ports, from which the pressure fluid is led out, and the switching a state of communication and discommunication among the first to the fourth outlet ports is carried out by a three-state switching control including: a base position state where the movable core stays at a base position, a first lift state with electric current supplied for the linear solenoid section, so as to let the movable core positioned at an intermediate position, and a second lift state with electric current supplied for the linear solenoid section, so as to let the movable core positioned at a displacement terminal position.

Other features and advantages of the present invention will become more apparent from the following detailed description of the invention when taken in conjunction with the accompanying exemplary drawings.

DETAILED DESCRIPTION OF THE EXEMPLARY EMBODIMENTS OF THE INVENTION

Figure 1:
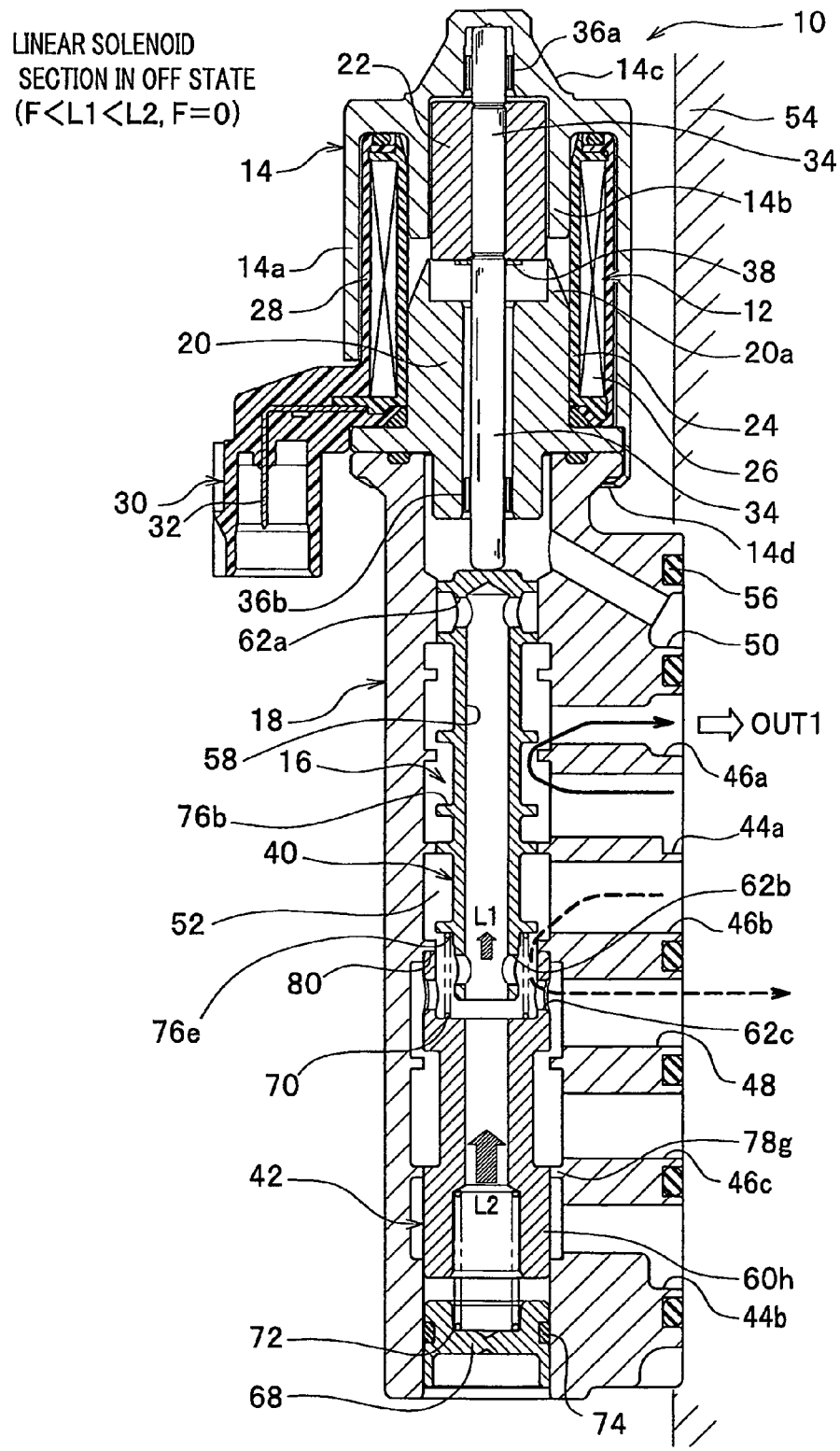
FIG. 1 is a vertical cross sectional view along the axial direction of an electromagnetic valve according to an embodiment of the present invention.

Hereinafter, embodiments of the present invention will be described in details, with reference to attached drawings where necessary.

With reference to FIG. 1 to FIG. 4, the electromagnetic spool valve 10 according to one embodiment of the present invention is made of magnetic metal material and formed in a cylindrical shape having a bottom, and includes a housing 14 in which a linear solenoid section 12 constituted by a direct action type linear solenoid is provided, and a valve body 18 in a sleeve shape, integrally formed with the housing 14, having the valve operating mechanism 16 therein. The housing 14 and the valve body 18 work together as a main body of the electromagnetic spool valve 10.

The housing 14 includes a cylinder 14a extendedly provided along the axial direction; a cylindrical yoke 14b provided inside the cylinder 14a, apart from the cylinder 14a at a predetermined distance in parallel, having a shorter length; and a bulge 14c provided at one end on the same side of the cylinder 14a and the cylindrical yoke 14b, having a recessed portion inside thereof in a longitudinal section view. At this time, the cylinder 14a, the cylindrical yoke 14b and the bulge 14c are integrally formed.

The above cylindrical yoke may be formed in such a manner that another different cylindrical yoke prepared separately from the housing 14 (not shown) is press-fit into a press-fitting portion (not shown) provided on the inner circumference of the bulge 14c of the housing 14.

The linear solenoid section 12 includes a coil assembly that is housed in the housing 14; the cylindrical yoke 14b provided inside the coil assembly that is integrally formed with the housing 14 at the closed end thereof; a fixed core 20 that is provided inside the coil assembly along the axial direction with a predetermined clearance from the cylindrical yoke 14b; and a movable core 22 slidably fit between the cylindrical yoke 14b and the fixed core 20.

One end of the fixed core 20, opposing the movable core 22 with the predetermined clearance, has an annular flange 20a having a tapered face on an outer circumference whose diameter gradually decreases toward the movable core 22 and whose longitudinal section face has a sharp angle. The coil assembly includes the coil bobbin 24 having a flange at each end thereof in the axial direction, made of resin material; and the coil 26 wound around the coil bobbin 24.

Between the housing 14 and the coil 26, there is provided a sealing member 28 of resin to mold the outer circumference of the coil 26 and the like, and the sealing member 28 made of resin material is formed integrally continued from the coupler 30 that is communicated with the coil 26. In the coupler 30, the terminal end 32 electrically connected to the coil 26 is provided to be exposed.

A shaft 34 is fixed to the movable core 22 such that the shaft 34 goes through the though hole at the center of the movable core 22, and one end (upper end) of the shaft 34 along the axial direction is axially supported via the first plane bearing 36a attached to the recessed portion of the bulge 14c of the housing 14 and the other end (lower end) of the shaft 34 is also axially supported via the second plane bearing 36b installed in the through hole at the center of the fixed core 20, so that the shaft 34 slidably moves in the axial direction. Note that the movable core 22 and the shaft 34 may not be constituted separately, but may be integrally constituted to include the shaft 34, alternatively.

Via the first and second plane bearings 36a, 36b, the shaft 34 is constituted to have a both-end support structure to be axially supported so that the shaft 34 slidably moves in the axial direction, thereby to secure stabile rectilinear movement of the movable core 22 that moves along with the movement of the shaft 34.

At the end face of the movable core 22 opposite to the fixed core 20, there is attached a ring 38 through the shaft 34, which is made of nonmagnetic material, functioning for preventing the movable core 22 from staying attracted onto the fixed core 20 due to residual magnetism when the current supply for the coil 26 is stopped.

In this case, when turning on the power source (not shown) to apply current to the coil 26, excitation effect is caused to displace the movable core 22 along with the shaft 34 toward the fixed core 20 side, thereby to operate the first spool 40 and or the second spool 42 (backward-forward movement), which will be described later.

The valve operating mechanism 16 includes the valve body 18, and the first and second spools 40, 42. On one side of the valve body, there are provided in alignment the first inlet port 44a, the second inlet port 44b, the first outlet port 46a, the second outlet port 46b, the third outlet port 46c, the drain port 48 and the supply-discharge port 50, respectively. The first spool 40 and the second spool 42 are provided such that the first spool 40 is disposed in contact with one end of the shaft 34 in the linear solenoid section 12 and is pushed by the shaft 34's axial sliding movement, whereby the first spool 40 and the second spool 42 slide along the axial direction of inner space 52 in the valve body 18.

The supply-discharge port 50 supplies and discharges air within the housing in accordance with the movable core 22's backward-forward movement. The first inlet port 44a, the second inlet port 44b, the first outlet port 46a, the second outlet port 46b, the third outlet port 46c, the drain port 48 and the supply-discharge port 50 function as plural ports through which pressure fluid flows.

The first and second spools 40, 42, each of which is constituted as a separate member in an approximately cylindrical shape, are co-axially disposed in line within the inner space 52 of the valve body 18. In this case, as shown in FIG. 8, the maximum outer diameter D2 of the second spool 42 (i.e. the outer diameter of the seventh land 60g and the eighth land 60h, described later) is set to be larger than the maximum outer diameter D1 (outer diameter of the first land 60a to the sixth land 60f, described later) of the first spool 40 (D1<D2).

As shown in FIG. 1, in the vicinity of each of the above-mentioned ports, when the valve body 18 is attached to a side wall of other members 54 such as an engine for a vehicle, for example, there is provided a single seal member 56 that seals a joint portion between each port and the other members 54.

Figure 8:
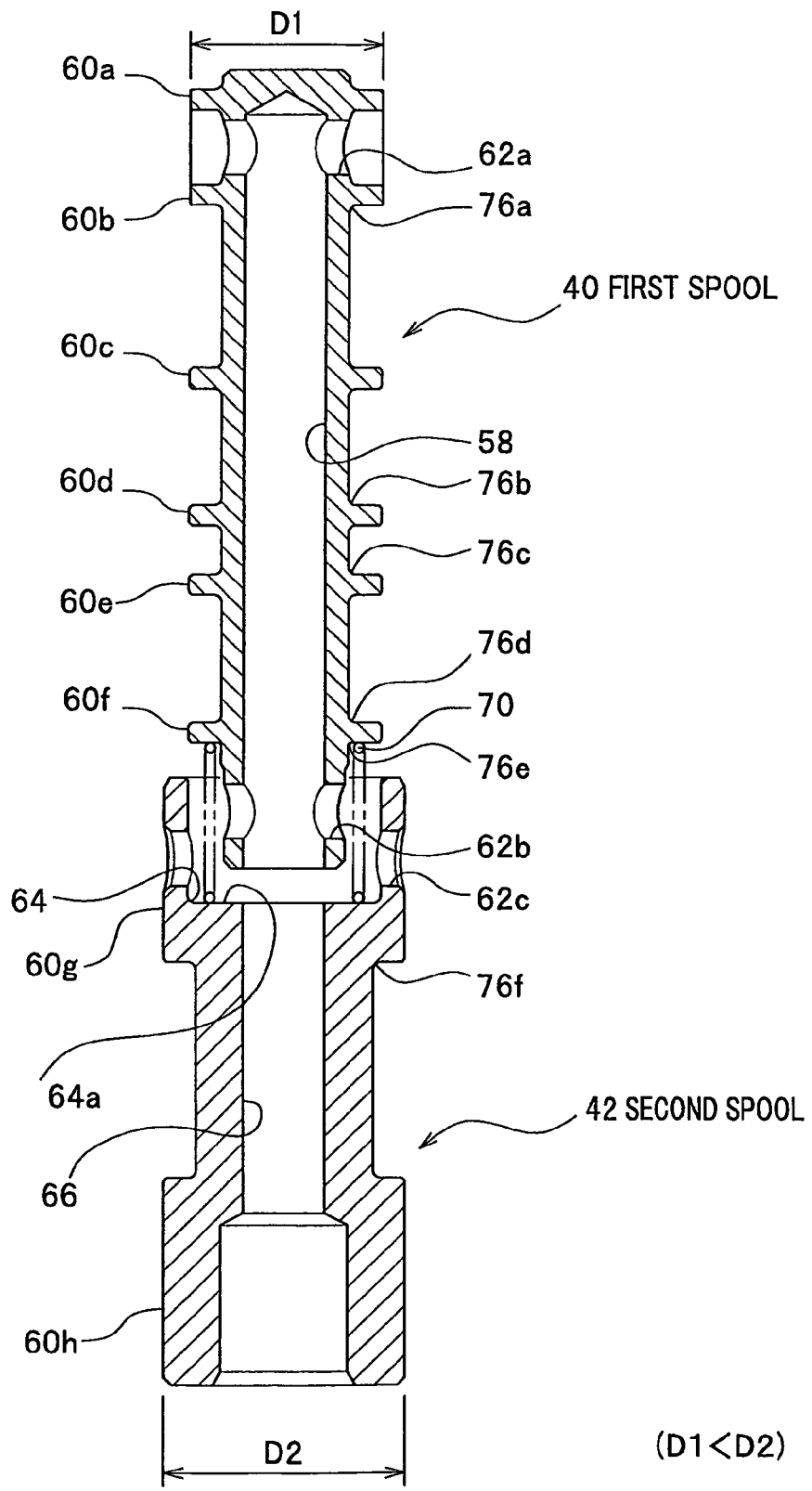
FIG. 8 is a vertical cross sectional view showing the first and second spools of the electromagnetic spool valve in the axial direction thereof.

As shown in FIG. 8, the first spool 40 has a long hollow 58 thereinside, which extends in the axial direction, closed at the upper end on the linear solenoid section 12 side, opening at the lower end on the second spool 42 side. In the vicinity of the upper end of the first spool 40, between the first land 60*a* and the second land 60*b* (described later), there is provided the first through hole 62*a*, in communication with the long hollow 58, extending vertically to the axial direction.

Between the lower end of the first spool 40 and the sixth land 60*f*, there is provided the second through hole 62*b*, which is in communication with the above-mentioned through hole 58, extending vertically to the axial direction. In this case, in the first lift state shown in FIG. 3 (described later), when the first outlet port 46*a*, the first through hole 62*a*, the long hollow 58, the second through hole 62*b*, the third through hole 62*c* and the drain port 48 (described later) come in communication with one another, the hydraulic pressure on the first outlet port 46*a* side is preferably discharged from the drain port 48.

As shown in FIG. 8, at the upper end of the second spool 42, there is provided the depressed portion 64, which meets and comes in contact with the lower end of the first spool 40. In the side wall of the depressed portion 64, there is provided the third through hole 62*c* in communication with the second through hole 62*b* of the first spool 40, extending vertically to the axial direction of the second spool 42. There is also provided in the second spool 42 a stepped though hole 66 in communication with the depressed portion 64, extending along the axial direction.

As shown in FIG. 1, the valve operating mechanism 16 includes a cap member 68 that is disposed to oppose the lower end of the second spool 42 to seal the inner space 52 within the valve body 18, the first spring member 70 at the overlapped portion between the first spool 40 and the second spool 42, and the second spring member 72 between the second spool 42 and the cap member 68. The cap member 68 functions as one end of the valve body 18, and is provided with the seal ring 74 in an annular groove of the circumferential surface thereof, thereby to maintain air tight and liquid tight at the installation portion of the cap member 68 to the valve body 18, and this cap member 68 is press-fitted into a bottom hole of the valve body 18.

At this time, the spring load (spring constant) L2 of the second spring member 72 is set to be larger than the spring load (spring constant) L1 of the first spring member 70 (L1<L2).

The present embodiment is exemplified using the first spring member 70 and the second spring member 72 that are constituted by coil springs respectively, but the present embodiment is not limited to this, and may also utilize elastic members such as a plate spring and rubber (not shown), or any other urging members for urging (applying pressed force to) the first spool 40 and the second spool 42.

The first inlet port 44*a* and the second inlet port 44*b* are connected to the hydraulic pressure source (not shown) such as a hydraulic pump (pressure fluid supply source), respectively, and the first outlet port 46*a* to the third outlet port 46*c* are connected to an appropriate hydraulic pressure operation unit of any hydraulic equipment (not shown) via output hydraulic passage, and the drain port 48 is connected to an appropriate reservoir tank (not shown). The present embodiment is exemplified using hydraulic pressure, but not limited to this, and may also utilizes pressure fluid including compressed air or the like as operational media, for example.

With reference to FIG. 8, the first spool 40 has annular projections referred to lands around the outer conferential surface thereof, radically extending outwards with a predetermined length, and the first land 60*a* to the sixth land 60*f* are arranged in the axial direction in order from the linear solenoid section 12 side toward the cap member 68 side. The first land 60*a* to the sixth land 60*f* have an identical outer diameter respectively, which constitutes the maximum outer diameter D1 of the first spool 40.

Figure 4:
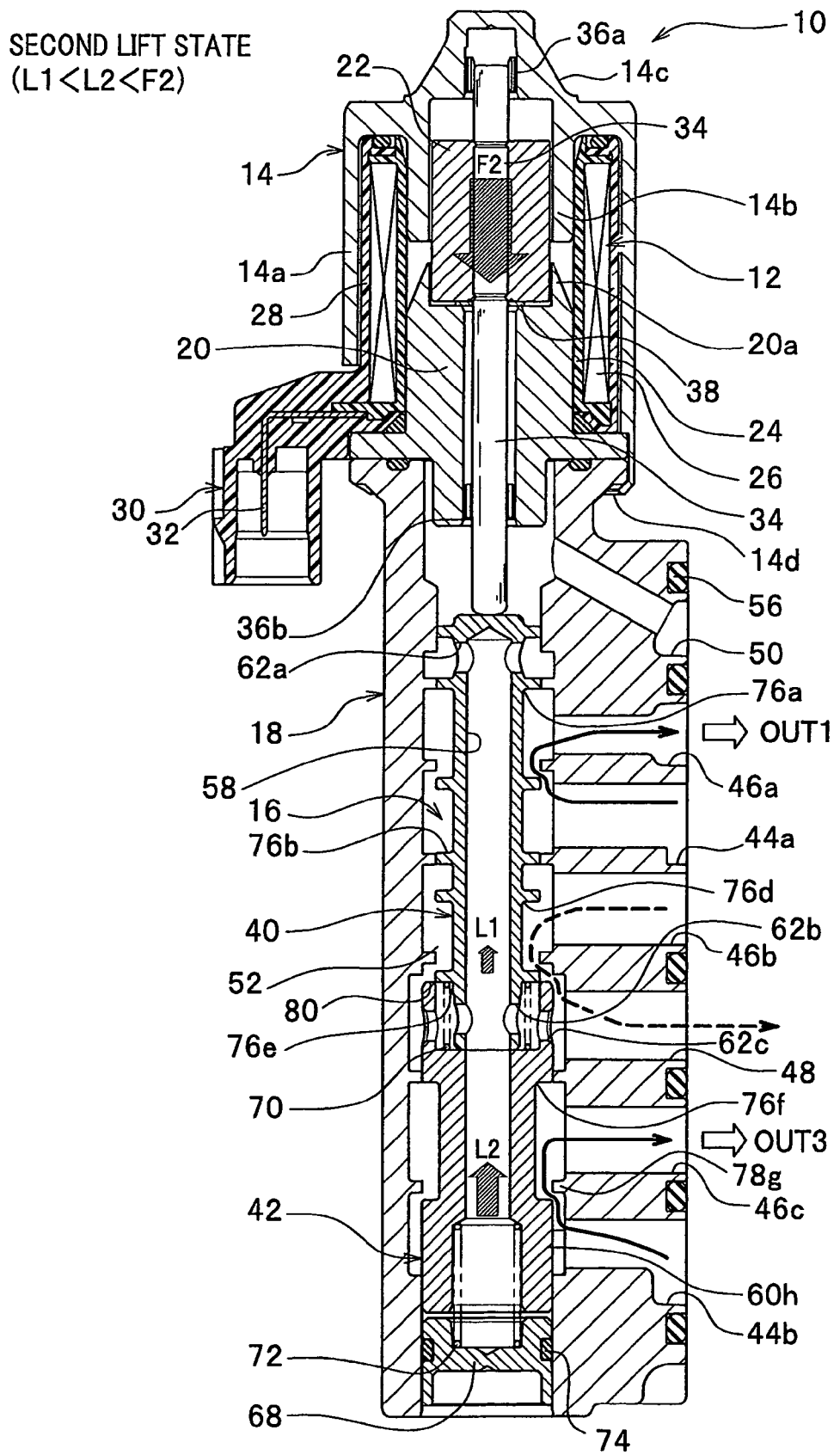
FIG. 4 is a vertical cross sectional view showing a first lift state in which great current is applied for the linear solenoid section, shifted from the first lift state of FIG. 2.

At this time, the first annular recess 76*a* is formed between the second land 60*b* and the third land 60*c* of the first spool 40, adjacent to each other, serving for communicating the first inlet port 44*a* with the first outlet port 46*a* (see the second lift state of FIG. 4). Similarly, the second annular recess 76*b* is formed between the third land 60*c* and the fourth land 60*d* of the first spool 40, adjacent to each other, serving for communicating the first inlet port 44*a* with the first outlet port 46*a* (see the solenoid off state of FIG. 1).

Figure 3:
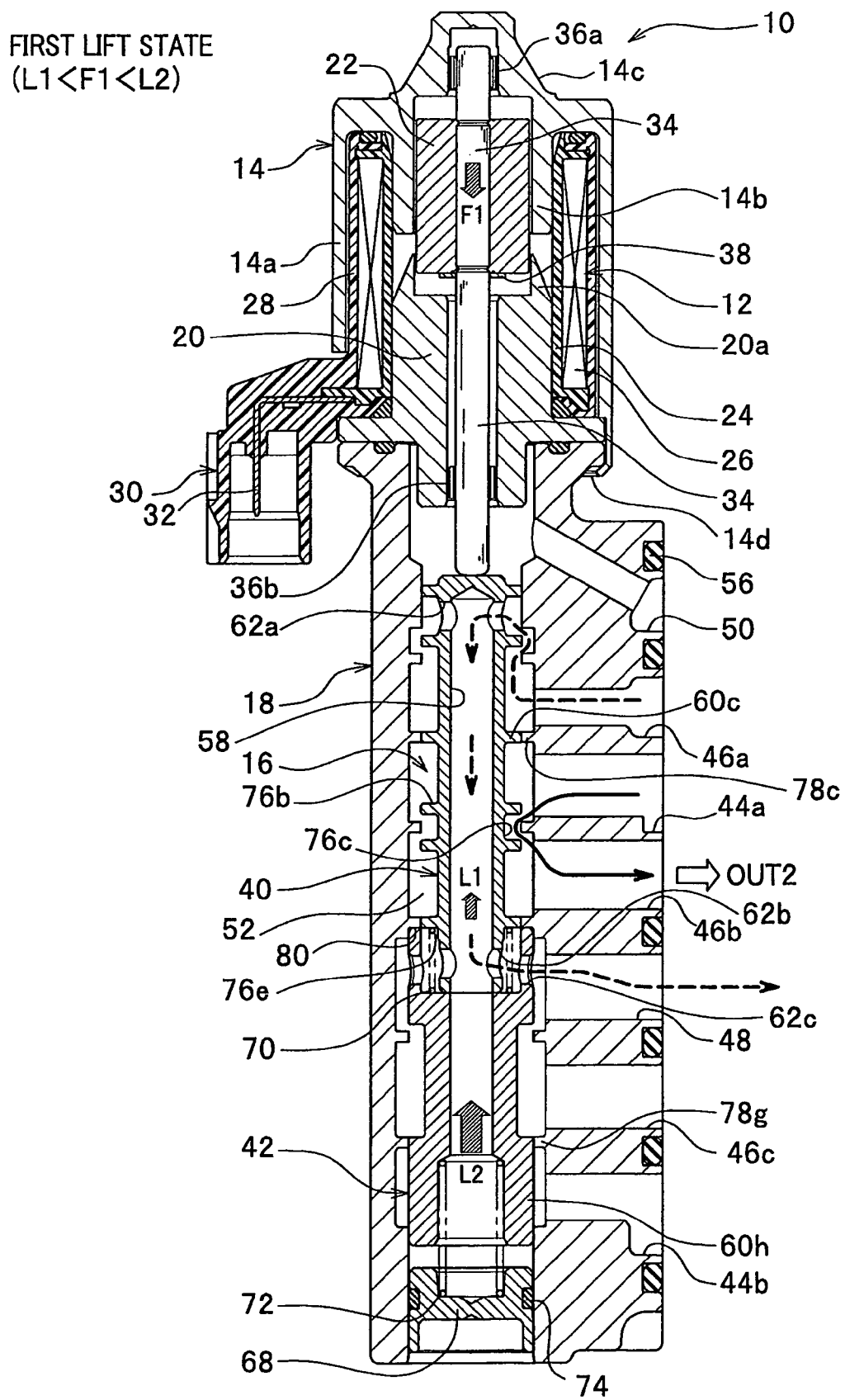
FIG. 3 is a vertical cross sectional view showing a first lift state in which moderate current is applied for the linear solenoid section, shifted from the valve-initial state of FIG. 2.

In addition, the third annular recess 76*b* is formed between the fourth land 60*d* and the fifth land 60*e* of the first spool 40, adjacent to each other, serving for communicating the first inlet port 44*a* with the second outlet port 46*b* (see the first lift state of FIG. 3). Furthermore, the fourth annular recess 76*b* is formed between the fifth land 60*e* and the sixth land 60*f* of the first spool 40, adjacent to each other, serving for communicating the second outlet port 46*b* with the drain port 48 (see the second lift state of FIG. 4). Yet furthermore, the fifth annular recess 76*e* is formed between the sixth land 60*e* and the lower end of the first spool 40, adjacent to each other, serving for communicating the second outlet port 46*b* with the drain port 48 (see the linear solenoid off state of FIG. 1).

In the upper end of the second spool 42 in vicinity of the first spool 40, there is provided the depressed portion 64 having an appropriate depth in the axial direction, and one end of the first spring member 70 is locked to the bottom wall surface 64*a* of the depressed portion 64, and the other end of the first spring member 70 is locked to the side wall of the sixth land 60*f* of the first spool 40. At this time, the inner diameter of the depressed portion 64 of the second spool 42 is set to be larger than that of the lower end of the first spool 40. The lower end of the first spool 40 is inserted into the depressed portion 64 of the second spool 42 with the first spring member 70 depressed, thus comes in contact with the bottom wall surface 64*a* of the depressed portion 64 (see FIGS. 6 and 7).

With reference to FIG. 8, there are projectedly provided the seventh land 60*g* and the eighth land 60*h* around the outer circumference of the second spool 42, with a wider width along the axial direction, radically extending outwards, and the seventh and eighth lands 60*g*, 60*h* form, approximately at the center of the second spool 42, the sixth annular recessed portion 76*f* that communicates the second inlet port 44*b* with the third outlet port 46*c* (see the second lift state of FIG. 4).

On the inner wall of the valve body 18, there is provided the first annular projection 78*a* with a wider width in the axial direction, projecting toward the inner space 52, and also the second annular projection 78*b* to the seventh annular projection 78*g* each having a narrower width are provided at a predetermined distance therebetween along the axial direction in order from the linear solenoid section 12 side to the cap member 68 side.

As mentioned above, the maximum outer diameter D1 of the first spool 40 and the maximum outer diameter D2 of the second spool 42 are set to be different from each other, thus corresponding to the difference in maximum outer diameter of D1 and D2 (D1<D2), the first annular projection 78*a* to the fifth annular projection 78*e* have an inner diameter different from that of the sixth and the seventh annular projections 78*f*, 78*g*.

Figure 9:
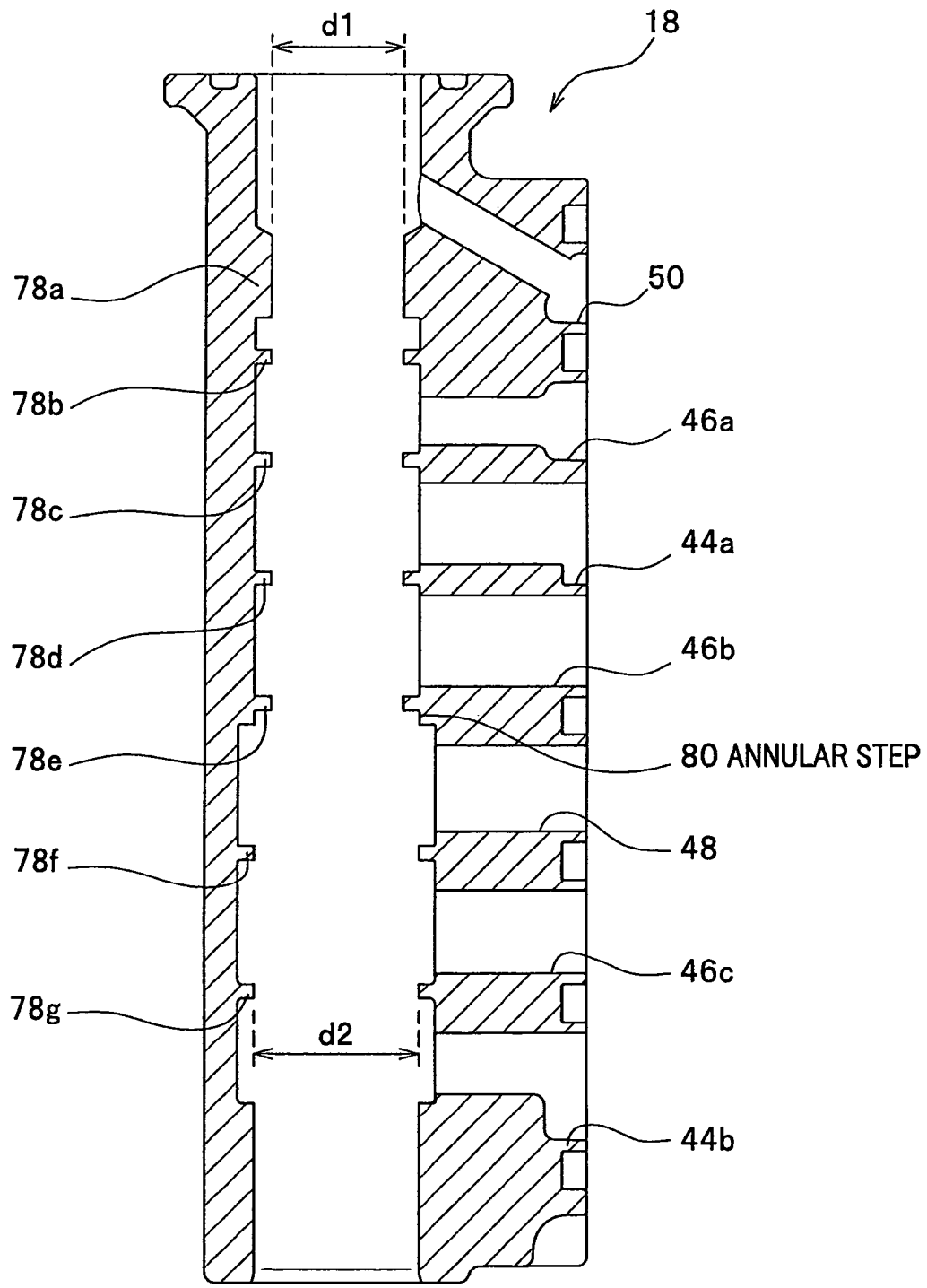
FIG. 9 is a vertical cross sectional view of the valve body of the electromagnetic spool valve in the axial direction thereof.

Specifically, with reference to FIG. 9, on the boundary of the approximate center of the valve body 18, the first annular projection 78*a* to the fifth annular projection 78*e* disposed on the housing 14 side are set to have a smaller inner diameter d1 than the inner diameter d2 of the sixth and seventh annular projections 78f, 78g disposed on the cap member 68 side (d1<d2).

Figure 5:
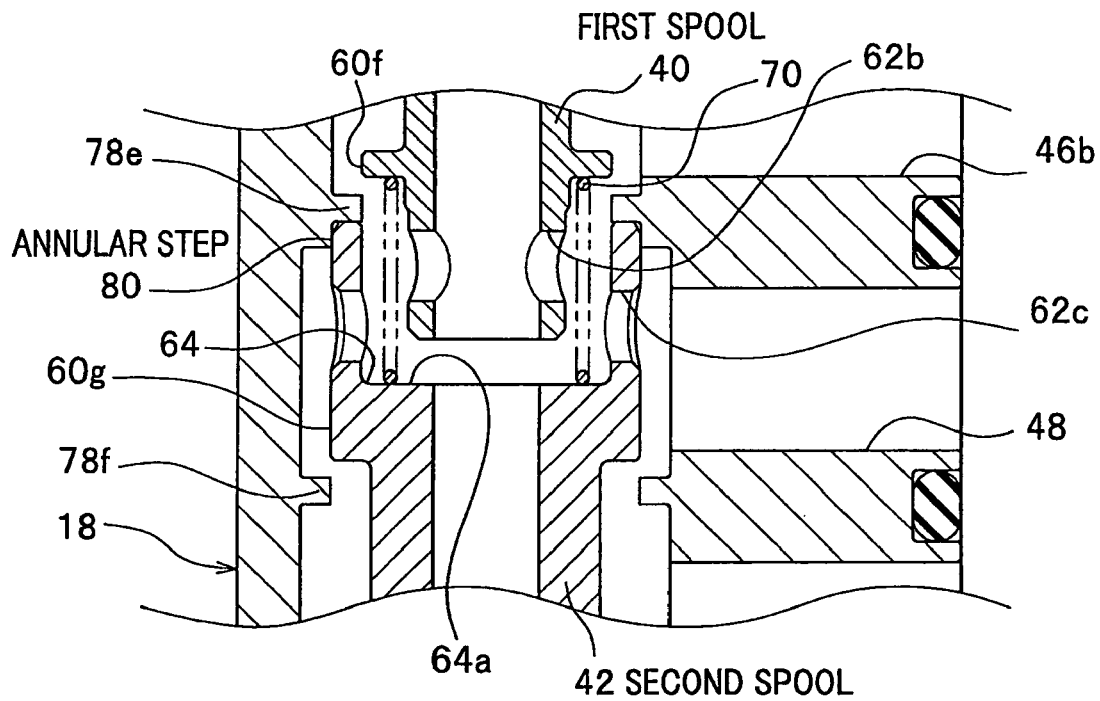
FIG. 5 is a partially enlarged view of longitudinal section showing an overlapped portion of the first and second spools of the electromagnetic spool valve when the linear solenoid section is in the off state shown in FIG. 1.

Therefore, the inner diameter of the valve body 18 is configured to be smaller on the linear solenoid 12 side and greater on the cap member 68 side, thereby to facilitate various operations carried out from the greater outer diameter side, such as cutting of the inner space 52 and assembling the first and second spools 40, 42 and the like in the valve body 18 (described later). With reference to FIGS. 5 and 9, around a portion adjacent to the fifth annular projection 78e in the inner space 52 of the valve body 18, there is provided an annular step 80 (also referred to as a "annular stopper") functioning as a stopper with which the upper end of the second spool 42 comes in contact and abuts when the linear solenoid section 12 is in the off state.

The electromagnetic spool valve 10 according to the present embodiment is constituted as mentioned above, and hereinafter descriptions will be provided on operations and operational effects of the electromagnetic spool valve 10.

Descriptions of how to assemble the electromagnetic spool valve 10 will be provided hereinafter.

Figure 10:
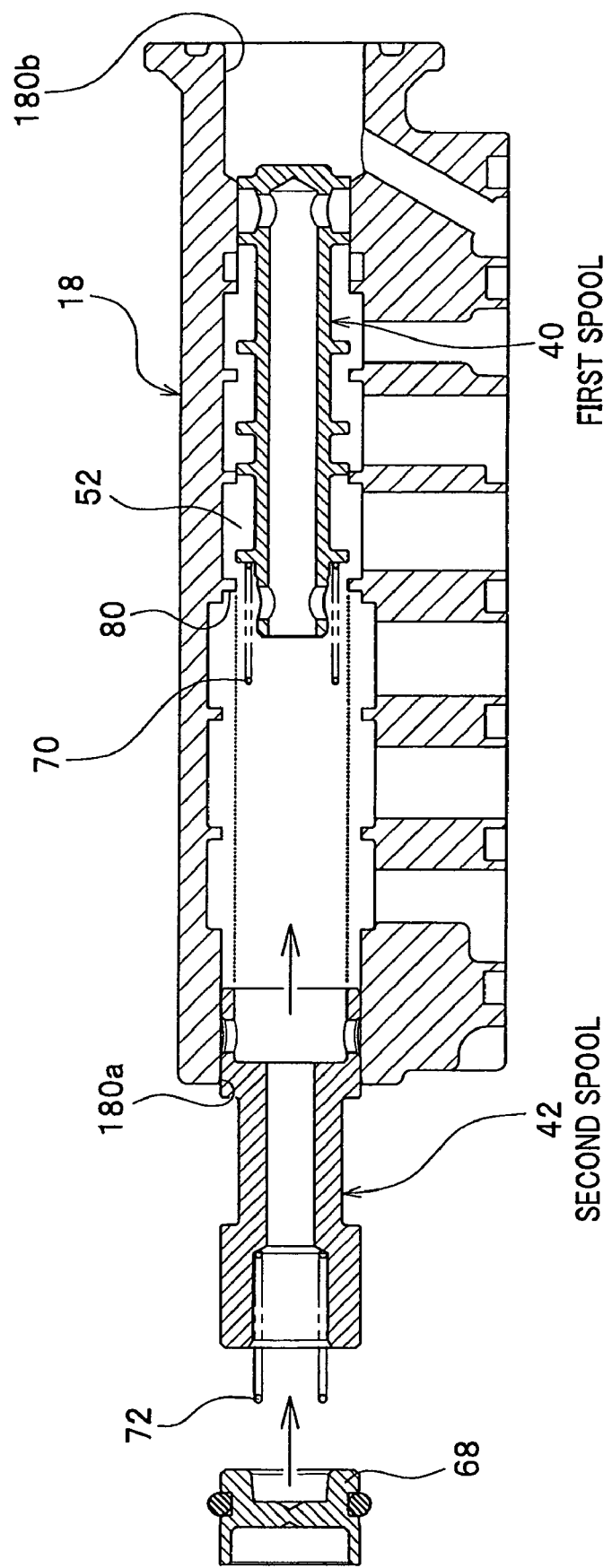
FIG. 10 is a vertical cross sectional view showing how to assemble the first and second spools into the valve body.

As mentioned above, the inner diameter of the inner wall of the valve body 18 is configured to be smaller on the linear solenoid 12 side, and to be greater on the cap member 68 side. With reference to FIG. 10, the first spool 40 and the first spring member 70 are inserted from the greater diameter opening 180a into the inner space 52 of the valve body 18, respectively, and the second spool 42 and the second spring member 72 are inserted respectively, and then the cap member 68 is pressed into the greater diameter opening 180a to be closed.

At this time, one end of the second spool 42, which is to be locked to the first spring member 70 of the first spool 40, comes in contact with the annular step 80 formed at the approximate center of the inner wall of the valve body 18 (see the dot lines of FIG. 10), thereby to position the second spool 42 at the predetermined position in the inner space 52. Therefore, even if the first spool 40 remains in a loosen state somewhat in the inner space 52 during the assembling, the pressing force of the second spring member 72 securely retains the second spool 42 to be contact with the annular step 80, which facilitates the assembling operation, resulting in enhancement of the assembly performance.

The valve body 18 and the housing 14 are jointed into one unit such that the thin-wall portion 14d (opposing the valve body 18) of the cylindrical portion 14a of the linear solenoid section 12 is clamped onto the outer circumferential wall of the smaller diameter opening 180b of the valve body 18 so as to close the smaller diameter opening 180b (see FIGS. 1 to 4).

Next, descriptions will be given on operations of the electromagnetic spool valve 10.

As shown in FIG. 1, when no current is supplied for the linear solenoid section 12, there is no electromagnetism (electromagnetic propulsion) generated of the linear solenoid section 12 (i.e. electromagnetic propulsion F=0), thus the first spool 40 is in a state of being pressed toward the linear solenoid section 12 side by the spring force (L1) of the first spring member 70, and the second spool 42 is in a state of being pressed toward the first spool 70 side by the spring force (L2) of the second spring member 72; so that the upper end of the second spool 42 comes in contact with and abuts the annular step 80, thereby to limit the second spool 42 to further displace toward the first spool 70 side.

As shown in FIG. 1, when the linear solenoid section 12 is in the off state, the second annular recessed portion 76b around the outer circumference surface of the first spool 40 communicates the first inlet port 44a with the first outlet port 46a, so that pressure oil fed from the first inlet port 44a is supplied via the second annular recessed portion 76b and the first outlet port 46a (OUT 1) to the other members 54.

Similarly, in the off state of the linear solenoid section 12, as shown in FIG. 1, the first spool 40 and the second spool 42 are positioned such that the lower end of the first spool 40 and the upper end of the second spool 42 are overlapped by each other. Therefore, the second outlet port 46b is communicated with the drain port 48 via the fifth annular recessed portion 76e of the first spool 40, so that residual pressure oil in the second outlet port 46b is discharged from the drain port 48.

In the off state of the linear solenoid section 12, as shown in FIG. 1, the eighth land 60h around the outer circumference surface of the second spool 42 comes in contact with the seventh annular projection 78g of the valve body 18, so that the second inlet port 44b and the third outlet port 46c are out of communication with each other.

As described above, when the linear solenoid section 12 is in the off state, the spring load L1 of the first spring member 70 is set to be smaller than the spring load L2 of the second spring member 72, and the electromagnetic propulsion F of the linear solenoid section 12 is zero, which is smaller than the spring load L1 of the first spring member 70, thus the movable core 22 stays at the base position that is the uppermost end position of the movable core 22 (F<L1<L2, F=0).

Figure 2:
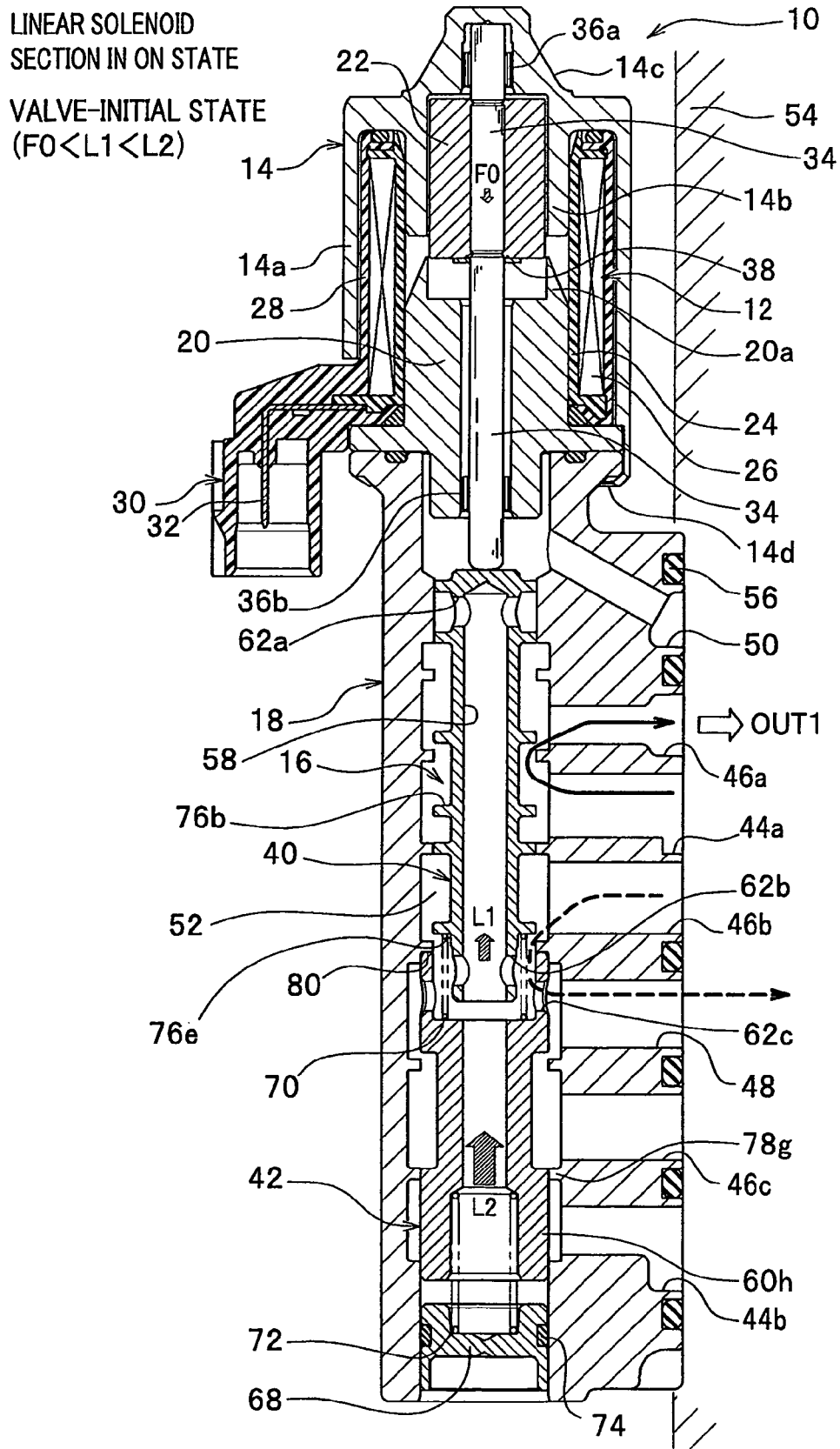
FIG. 2 is a vertical cross sectional view showing a valve-initial state in which small current is applied for the linear solenoid section, shifted from the off sate of FIG. 1.

Next, the linear solenoid section 12 comes in a valve-initial state when being supplied with (e.g. very) small current of a predetermined value, using an appropriate current value switching device (not shown) (e.g. a not shown driver controlled with control signals sent from a control system to supply current to the coil so as to urge the coil 26). However, in this valve-initial state, as shown in FIG. 2, even if small current is supplied for the linear solenoid section 12 in the off state, the first and second spools 40, 42 never displace, thus in this valve-initial state, the valve position is still maintained to be equal to the off state of the linear solenoid section 12.

Specifically, in this valve-initial state, although a very small electromagnetic propulsion F0 is generated by small current applied to the linear solenoid section 12, this F0 is set to be smaller than the spring load L1 of the first spring member 70 and the spring load L2 of the second spring member 72; i.e. F0<L1<L2. Accordingly, in the valve-initial state in which the electromagnetic propulsion F0 generated in the linear solenoid section 12 is set to be smaller than the first spring load L1 and the second spring load L2, no driving force is transmitted to the first and second spools 40, 42, so that the first and second spools 40, 42 remain at the position when the linear solenoid section 12 is in the off state in which the lower end portion of the first spool 40 and the upper end portion of the second spool 42 are overlapped by each other.

Next, when the current value (I) is controlled by the current value switching device (not shown) to supply moderate current that is greater than the above-mentioned small current for the linear solenoid section 12 (see FIG. 11) so that the linear solenoid section 12 comes into the first lift state. In this first lift state, as shown in FIG. 3, due to electromagnetism (electromagnetic propulsion F1) in proportion to the current value supplied to the coil 26, the movable core 22 is attracted toward the fixed core 20 side, and stops at the intermediate position.

Figure 6:
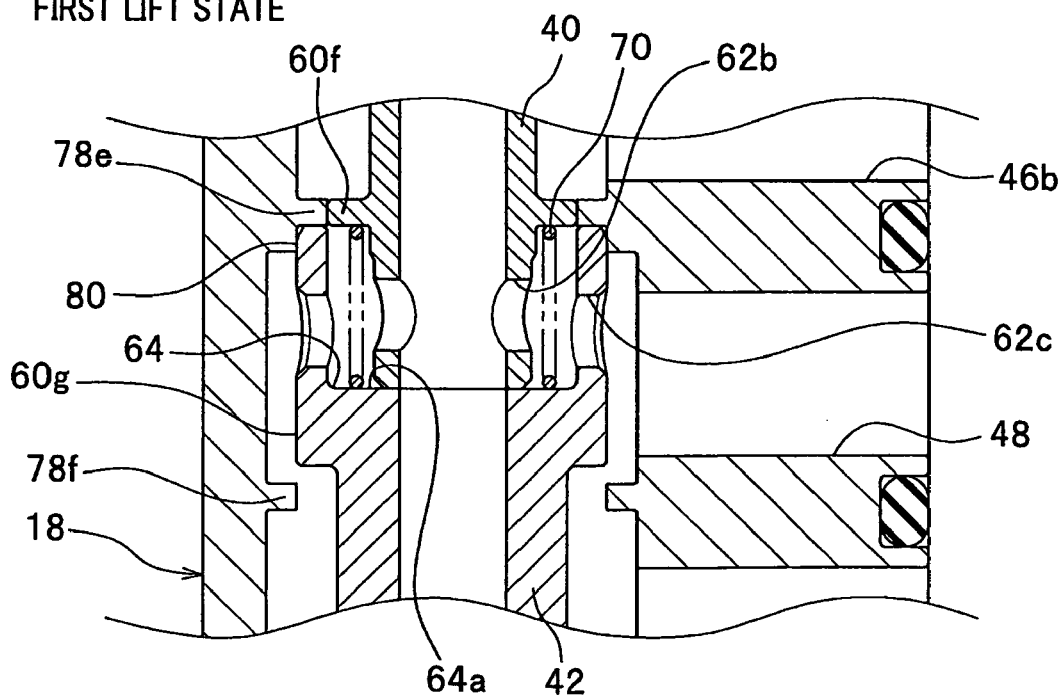
FIG. 6 is a partially enlarged view of longitudinal section showing the overlapped portion of the first and second spools when the linear solenoid section is in the first lift state shown in FIG. 3.

Specifically, displacement of the movable core 22 and the shaft 34 is transmitted to the first spool 40, the first spool 40 displaces toward the second spool 42 side while moving against the spring force (L1) of the first spring member 70, and then the lower end of the first spool 40 comes in contact with and abuts the bottom surface 64a of the depressed portion 64 of the second spool 42, where the displacement of the first spool 40 is limited (see FIG. 6).

As shown in FIG. 3, when the third land 60c of the first spool 40 comes in contact with the third annular projection 78c of the valve body 18, the first inlet port 44a comes out of communication with the first outlet port 46a, and at the same time, the third annular recessed portion 76c allows the first inlet port 44a to communicate with the second outlet port 46b, thereby to switch the valve position. Accordingly, the pressure oil led from the first inlet port 44a is supplied via the third annular recessed portion 76c and the second outlet port 46b (OUT2) to the other members 54. At this time, as shown in FIG. 6, while the lower end portion of the first spool 40 and the upper end portion of the second spool 42 are overlapped by each other, the second through hole 62b of the first spool 40 laps with the third through hole 62c of the second spool in the approximately horizontal direction. Thus, as shown in FIG. 3, the first outlet port 46a comes in communication with the drain port 48, via the first through hole 62a, the long hollow 58 and the second through hole 62b of the first spool 40 as well as the third through hole 62c of the second spool 42, so that the residual pressure oil in the first outlet port 46a is preferably discharged from the drain port 48.

In the first lift state, the current value (I), which has been switched to be moderate current, greater than the small current for the valve initial state, is supplied for the linear solenoid section 12, and the electromagnetic propulsion F1 greater than the spring load L1 of the first spring member 70 but smaller than the spring load L2 of the second spring member 72 is generated in the linear solenoid section 12, so that the movable core 22 is stopped at the intermediate position (L1<F1<L2). Hence, the electromagnetic propulsion F1 generated in the linear solenoid 12 can push and displace the first spool 40, but cannot push and displace the second spool 42. Note that the position of the core 22 in this state is referred to as the "intermediate position".

As a result, in this first lift state, only the first spool 40 is displaced and comes in contact with and abuts the second spool 42 so that the displacement of the first spool 40 is limited, meanwhile the second spool 42 stays at its original position.

According to the present embodiment, small current has been supplied in advance for the linear solenoid section 12 at the time of shifting the valve-initial state to the first lift state, which realizes more quick shift from the valve-initial state to the first lift state, in comparison with a case of shifting from the off state of the linear solenoid with no current supplied for the linear solenoid section 12 (see FIG. 1) to the first lift state (see FIG. 3), thus reducing at minimum the valve operation delay when executing the switching control, resulting in enhancement of the valve operational response.

Figure 11:
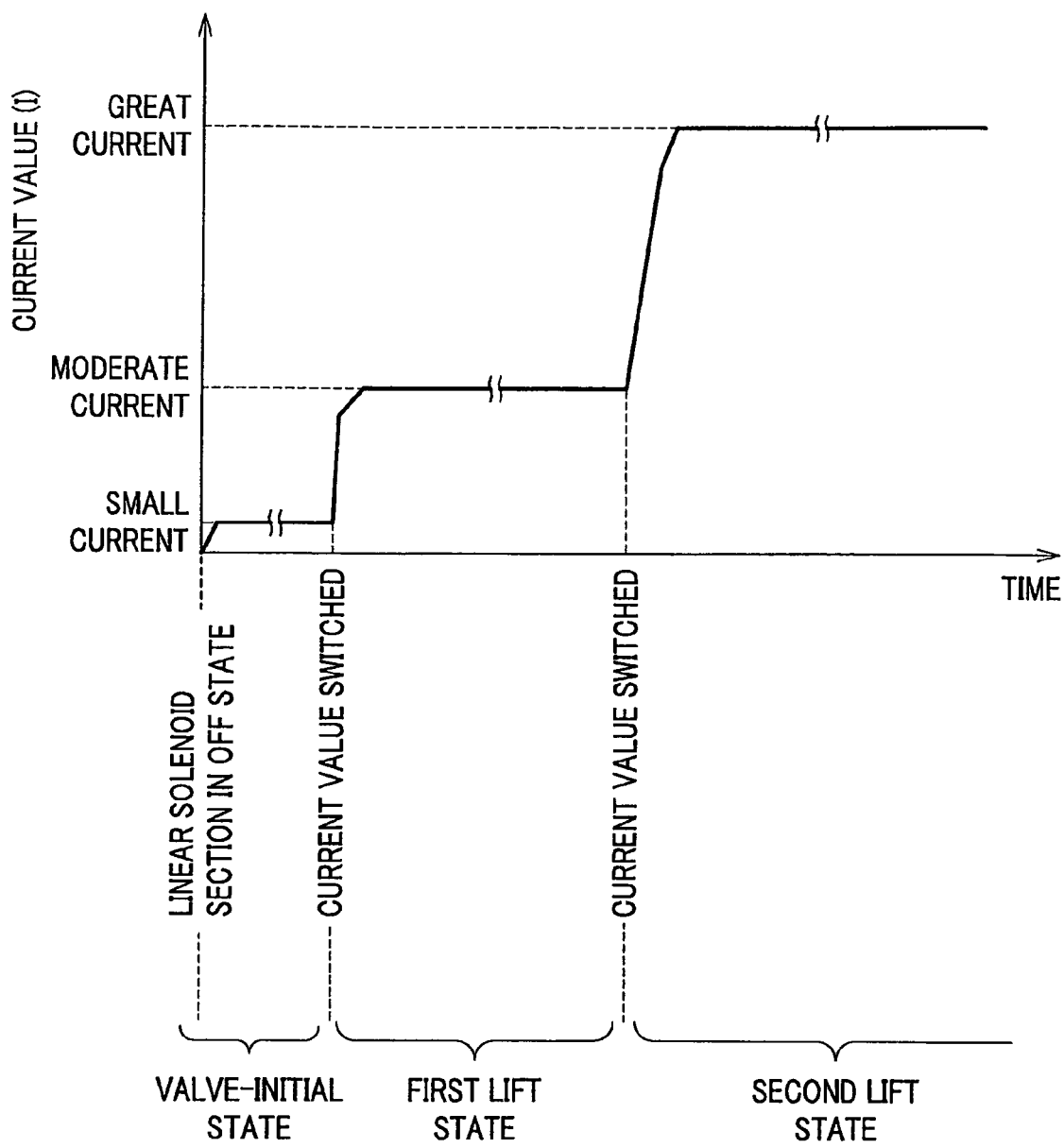
FIG. 11 shows a characteristic curve of current value shifting from small current, moderate current to great current, respectively applied to the linear solenoid section beginning with the off state.
Figure 12:
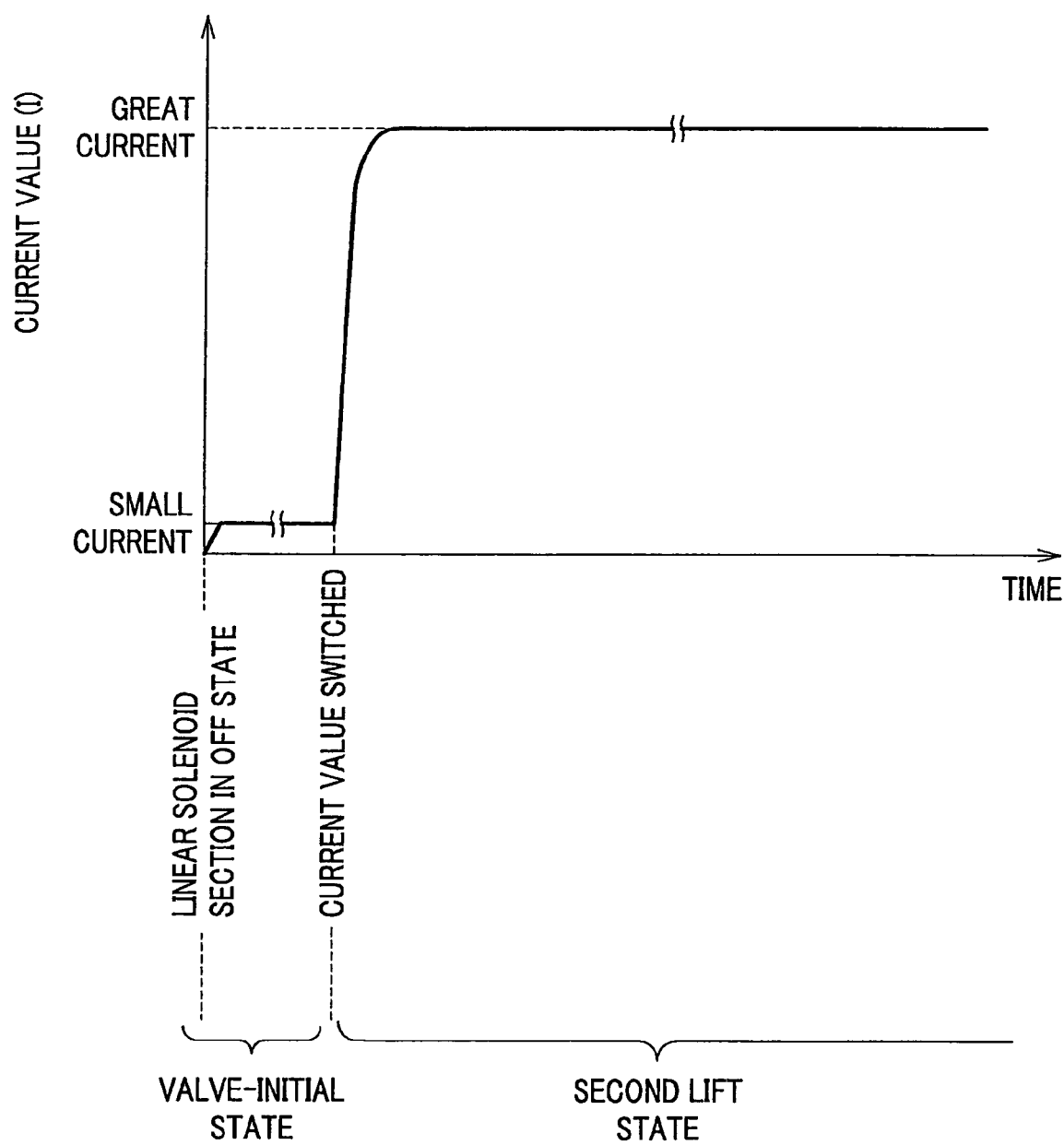
FIG. 12 shows a characteristic curve of current value shifting from small current directly to great current applied to the linear solenoid section beginning with the off state.

In other words, the present embodiment provides a standby stage of supplying small current for the linear solenoid section 12 (the valve-initial state) between the off state and the first lift state, not directly shifting from the off state (see FIG. 1) to the first lift state (see FIG. 3) of the linear solenoid section 12. This realizes a preferable wave form of a pulse signal's initial rise at the time of switching the current value, thus enhancing response performance of the valve operation, as shown in FIG. 11.

Next, the current value (I) is switched and controlled by the not-shown current value switching device to supply great current, greater than the moderate current, for the linear solenoid section 12 (see FIG. 11), so as to come into the second lift state. As shown in FIG. 4, in the second lift state, electromagnetic force (the electromagnetic propulsion F2) in proportion to the current value supplied to the coil 26 attracts the movable core 22 toward the fixed core 20 side, and then the movable core 22 stops at the lowermost position (also referred to as a "displacement terminal position").

Specifically, further displacement of the movable core 22 and the shaft 34 is transmitted via the first spool 40 to the second spool 42, and the first and second spools 40, 42 are displaced together toward the cap member 68 side while moving against the second spring force (L2) of the first spring member 72.

At this time, as shown in FIG. 4, the fourth land 60d of the first spool 40 and the fourth annular projection 78d of the valve body 18 come in contact with each other, thereby to set the first inlet port 44a to be out of communication with the second outlet port 46b, and the first annular recessed portion 76a around the outer circumference surface of the first spool 40 switches the valve position to communicate the first inlet port 44a with the first outlet port 46a. At the same time, the second inlet port 44b and the third outlet port 46c come in communication with each other via the sixth annular recessed portion 76f around the outer circumference surface of the second spool 42.

As a result, the pressure oil led from the first inlet port 44a is supplied via the first annular recessed portion 76a and the first outlet port 46a (OUT1) for the other members 54, and similarly, the pressure oil led from the second inlet port 44b is supplied via the sixth annular recessed potion 76f and the third outlet port 46c (OUT3) for the other members 54.

The second outlet port 46b comes in communication via the fourth annular recessed portion 76b with the drain port 48, thus the residual pressure oil in the second outlet port 46b is preferably discharged from the drain port 48.

Figure 7:
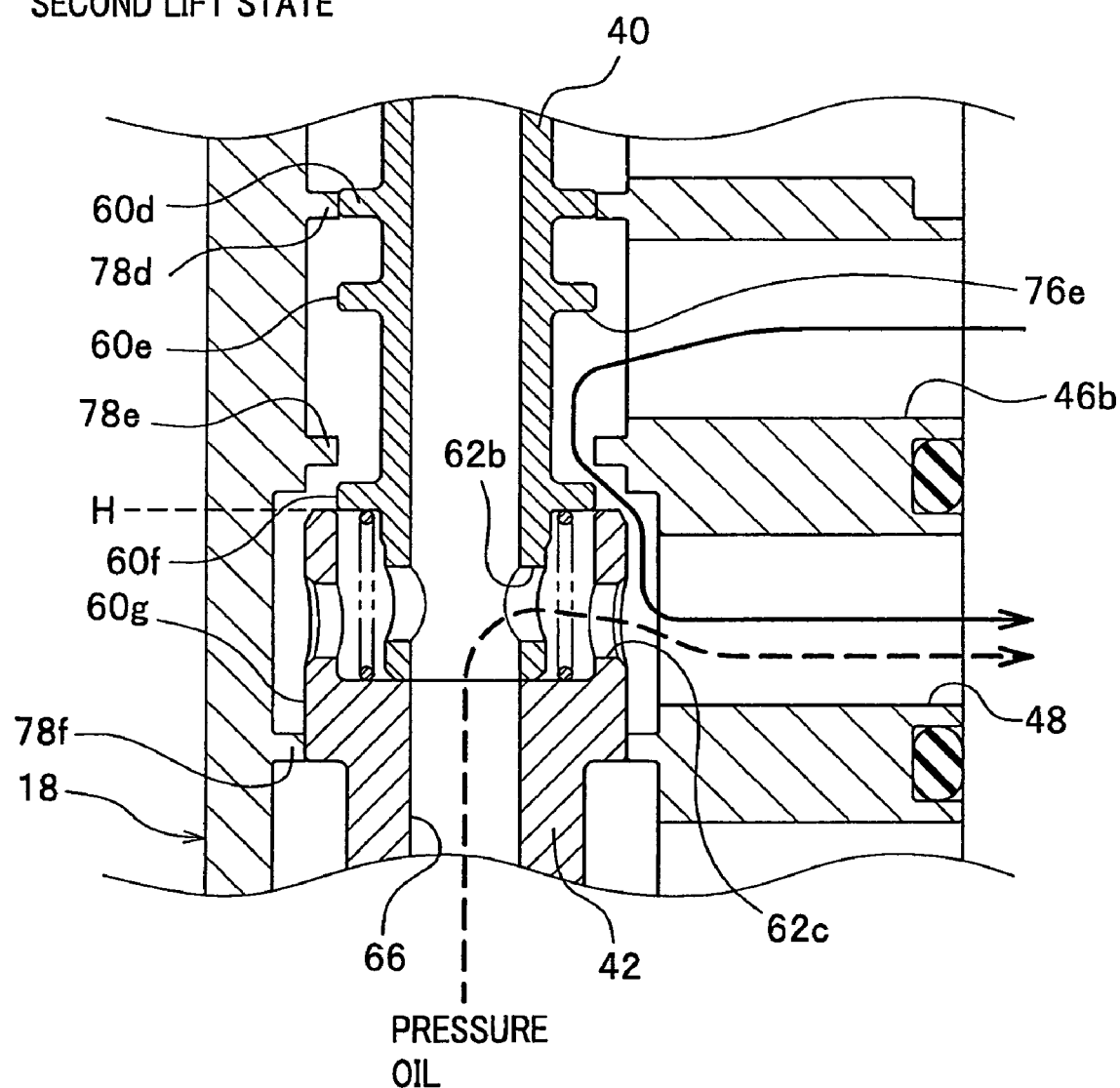
FIG. 7 is a partially enlarged view of longitudinal section showing the overlapped portion of the first and second spools when the linear solenoid section is in the second lift state shown in FIG. 4.

At this time, as shown in FIG. 7, the upper end face of the second spool 42 and the side wall face of the sixth land 60f formed at the lower end portion of the first spool 40 has an approximately identical height H, thereby to smoothen pressure oil flow from the second outlet port 46b to the drain port 48.

As shown in FIG. 7, the second spool 42 is provided with the stepped through hole 66 extending along the axial direction therein, pressure oil remaining between the upper end of the second spool 42 and the cap member 68 is preferable discharged via the stepped through hole 66, the second through hole 62b and the third through hole 62c to the drain port 48.

In the second lift state, the current value (I) has been switched from the moderate current of the first lift state to the great current for the linear solenoid section 12, in which the electromagnetic propulsion F2, greater than not only the spring load L1 of the first spring member 40 but also the spring load L2 of the second spring member 42, is generated in the linear solenoid section 12, so that the movable core 22 stops at the lowermost end position (i.e. displacement terminal position) (L1<L2<F2). Note that the position of the movable core 22 in this state is referred to as the "displacement terminal position". Hence, the electromagnetic propulsion F2 generated in the linear solenoid section 12 pushes the first and second spools 40, 42 so as to displace them together almost at the same time.

In the second lift state, the electromagnetic propulsion F2 generated in the linear solenoid section 12 displaces the first and second spools 40, 42 coaxially moving against the spring forces L1, L2 of the first and second spring members 70, 72, so that the first inlet port 44a and the first outlet port 46a come in communication with each other, and also the second inlet port 44b and the third outlet port 46c come in communication with each other, thereby to supply the pressure oil via the first outlet port 46a (OUT1) and the third outlet port 46c (OUT3) for the other members 54.

As described above, the present embodiment secures high-accurate three-state switching control includes: (1) the off state (see FIG. 1) and the valve-initial state (see FIG. 2) with small current for the linear solenoid section 12, (2) the first lift state (see FIG. 3) with moderate current for the linear solenoid section 12, and (3) the second lift state (see FIG. 4) with great current for the linear solenoid section 12.

Figure 13:
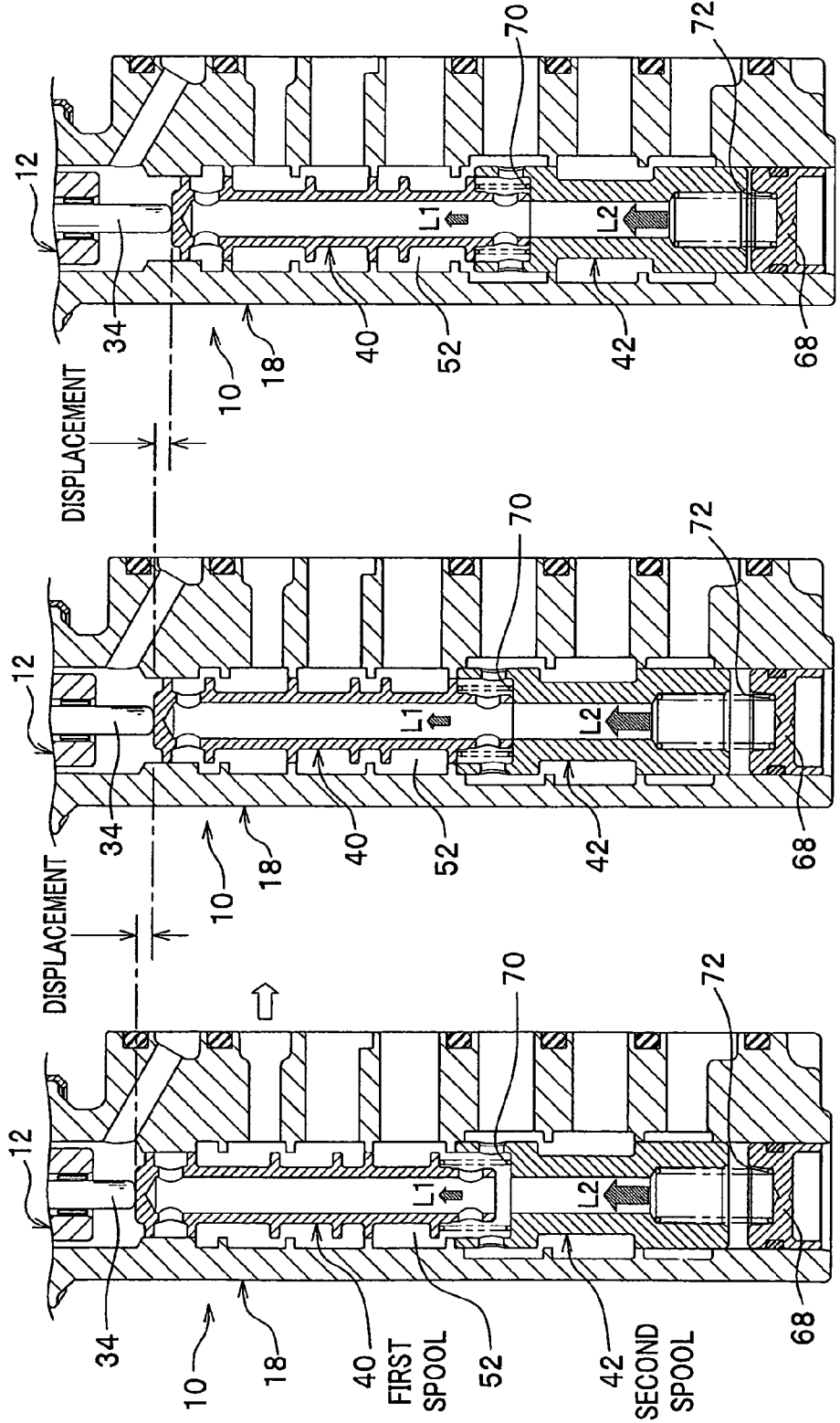
FIG. 13A is a partial longitudinal section view showing a positional relation between the first and second spools in the off state and the valve-initial state of the linear solenoid section.
FIG. 13B is a partial longitudinal section view showing a positional relation between the first and second spools in the first lift state.
FIG. 13C is a partial longitudinal section view showing a positional relation between the first and second spools in the second lift state.

Next, FIG. 13 shows the positional relation between the first spool 40 and the second spool 42 when controlled in accordance with the three states.

As shown in FIG. 13A, the off state and the valve-initial state of the linear solenoid section 12 provide the valve position between the first and second spools 40, 42 such that the spring force of the first spring member 70 retains the first spool 40 and the second spool 42 out of contact, but close to each other along the axial direction with the first spool 40 and the second spool 42 overlapped at each end portion thereof by each other. In other words, the first and second spools 40, 42 are set to be positioned such that they are out of contact with each other due to the spring force of the first spring member 70 provided therebetween, but the first and second spools 40, 42 are close to each other such that the end portion of the first spools 40 is overlapped by the second spool 42 in the depressed portion 64 thereof.

Next, as shown in FIG. 13B, in the first lift state, the first and second spools 40, 42 are positioned such that the first spool 40 is displaced toward the second spool 42 side while resisting the spring force of the first spring member 70, so that the first spool 40 comes in contact with and abuts the second spool 42. At this time, the spring load L1 of the first spring member 70 is set to be smaller than the spring load L2 of the second spring member 72, so that only the first spool 40 slides resisting the spring force of the first spring member 70, and the second spool 42 does not slide.

In addition, as shown in FIG. 13C, in the second lift state, the first and second spools 40, 42 are positioned such that the first and second spools 40, 42 are retained in contact and displaced together with each other, toward one end of the valve body 18 at the predetermined distance while resisting the spring force of the second spring member 72.

As such, the present embodiment sets variety of positioning between the first and second spools 40, 42 that are coaxially disposed in series in the above-mentioned manner, thereby to realize an high accurate switching control of pressure of pressure fluid in accordance with the above-mentioned three states including: (1) the off state and the valve-initial state with small current supplied for the linear solenoid section 12, (2) the first lift state with moderate current supplied for the linear solenoid section 12, and (3) the second lift state with great current supplied for the linear solenoid section 12.

The present embodiment may omit the valve-initial state with small current supplied for the linear solenoid section 12, and embody a high accurate switching control of pressure of pressure fluid by using the three-state control including the off state (FIG. 1), the off state (FIG. 1), the first lift state (FIG. 3) and the second lift state (FIG. 4) of the linear solenoid section 12.

As shown in FIGS. 1 to 4, the present embodiment uses the single common drain port 48 for three ports of the first outlet port 46a to the third outlet port 46c, thus realizing reduction of the number of drain ports compared to a conventional case (requires more than one drain port if there are three outlet ports, for example).

In addition, the present embodiment, as shown in FIG. 7, the first spool 40 and the second spool 42 are coaxially arranged in the inner space 52 of the valve body 18 in such a manner that the lower end portion of the first spool 40 and the upper end portion of the second spool 42 are overlapped by each other, which reduces the axial length of the drain port 48 so as to further reduce the axial length of the valve body 18.

In the above descriptions, the present embodiment exemplifies the switch control of the current value (I) that is supplied for the linear solenoid section 12 by the not-shown current value switching device, in order from small current, moderate current to great current in turn (see FIG. 11), but the present embodiment is not limited to this, and may switch the current value (I) of small current in the valve-initial state directly to great current in the second lift state, skipping moderate current, for example. Alternatively, the present invention may switch the current value (I) in order from great current, moderate current to small current in turn so as to reduce the supplied current (I) supplied to the linear solenoid section 12, or may switch great current to small current, skipping moderate current. As described above, the present embodiment flexibly switches the current value (I) supplied to the linear solenoid section 12 among three current values of small, moderate and great currents.

Next, with reference to FIG. 20, hereinafter a comparative example will be provided, which switches hydraulic pressure in three states, similar to the present embodiment. In this comparative example, a three-port two-position electromagnetic valve 100 (hereinafter referred to as a "three-way valve 100") and a two-port two-position electromagnetic valve 110 (hereinafter referred to as a "two-way valve 100") are combined to control pressure oil in three states.

Figure 20A:
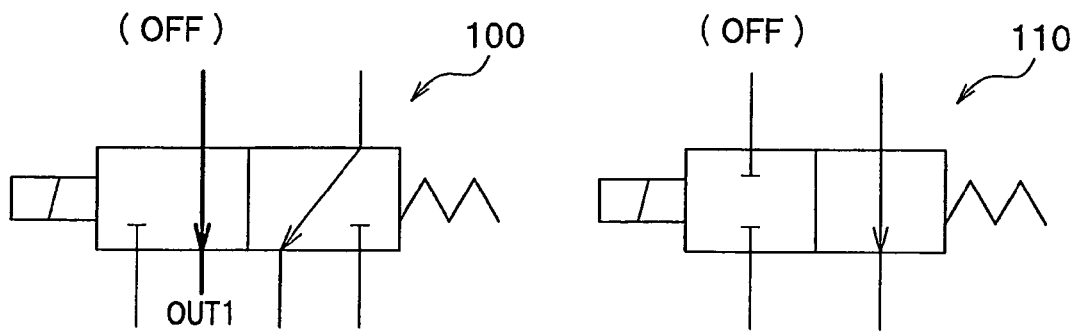
FIG. 20A is a circuit diagram of an electromagnetic spool valve according to a comparison.
Figure 20B:
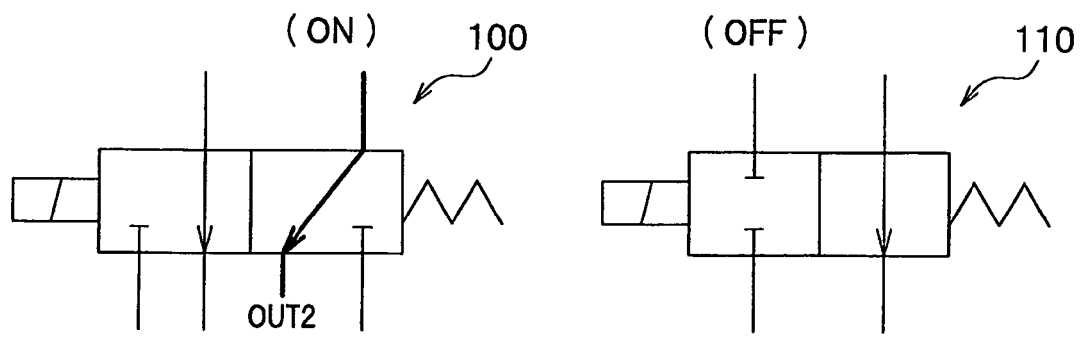
FIG. 20B is a circuit diagram of an electromagnetic spool valve according to a comparison.
Figure 20C:
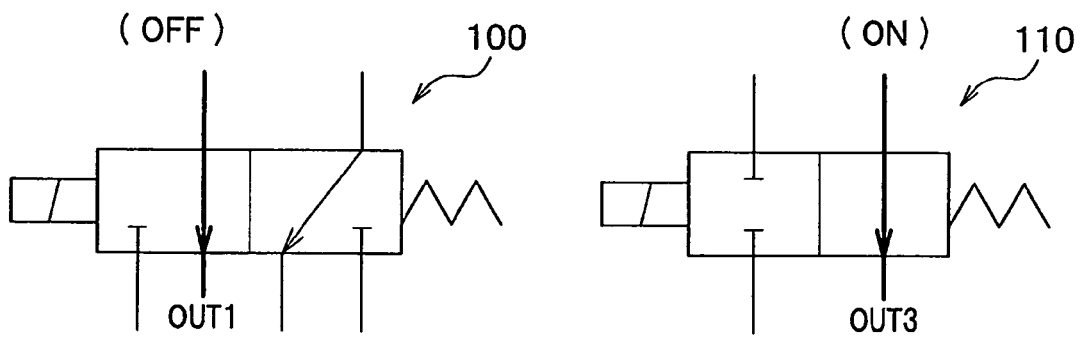
FIG. 20C is a circuit diagram of an electromagnetic spool valve according to a comparison.

Brief descriptions of a valve system according to this example will be given now. With reference to FIG. 20A, both the three-way valve 100 and the two-way valve 110 are set to be in off state, so that pressure oil is discharged only from OUT1 of the three-way valve 100. With reference to FIG. 20B, the three-way valve 100 is set to be in on state and the two-way valve 110 is set to be in off state, so that pressure oil is discharged only from OUT2 of the three-way valve 100. With reference to FIG. 20C, the three-way valve 100 is set to be in off state and the two-valve 110 is set to be in on state, so that pressure oil is discharged from OUT1 of the three-way valve 100 as well as from OUT3 of the two-way valve 110 at the same time.

In this way, the example of combination of the three-way valve 100 and the two-way valve 110 to switch pressure oil in three states requires two valves, as mentioned above (therefore, two solenoid sections required, too), thus there have been difficulties in increase of weight and cost due to requirement of a larger valve body.

To the contrary, the present embodiment provides the first spool 40 and the second spool 42 coaxially in series in the single-unit main body (i.e. combined body of the housing 14 and the valve body 18) to move together, as well as the first spring member 70 and the second spring member 72 each of which has a different spring load, thereby to realize reduction of size and weight of the entire electromagnetic spool valve, in comparison of the above example, hence resulting in reduction of cost.

The present embodiment provides three outlet ports of the first outlet port 46a to the third outlet port 46c, but is not limited to this.

Next, hereinafter descriptions will be provided on the electromagnetic spool valve 10a according to another embodiment of the present invention, which have four outlet ports of the first outlet port 46a to the fourth outlet port 46b, having one more outlet port, with reference to FIGS. 14 to 19. Note that the same numerical references are used for the same components, and detailed descriptions will be omitted.

As shown in FIGS. 14 to 19, the electromagnetic spool valve 10*a* according to the another embodiment includes the valve body 18*a*, and the first spool 40 and the second spool 42*a*. On one side of the valve body 18*a*, there are provided in alignment the first inlet port 44*a*, the second inlet port 44*b*, the first outlet port 46*a*, the second outlet port 46*b*, the third outlet port 46*c*, the fourth outlet port 46*d*, the drain port 48 and the supply-discharge port 50. The first spool 40 and the second spool 42*a* are slidably provided along the axial direction of the inner space 52 in the valve body 18*a*, respectively.

Specifically, the valve operating mechanism 16 is provided with two ports through which pressure oil is led in, four ports through which pressure oil is led out, and one port for discharging drains.

In this case, the first inlet port 44*a*, the second inlet port 44*b*, the first outlet port 46*a*, the second outlet port 46*b*, the third outlet port 46*c*, the fourth outlet port 46*d* and the drain port 48 function as plural ports, respectively, through which pressure fluid flows in and out.

Figure 18:
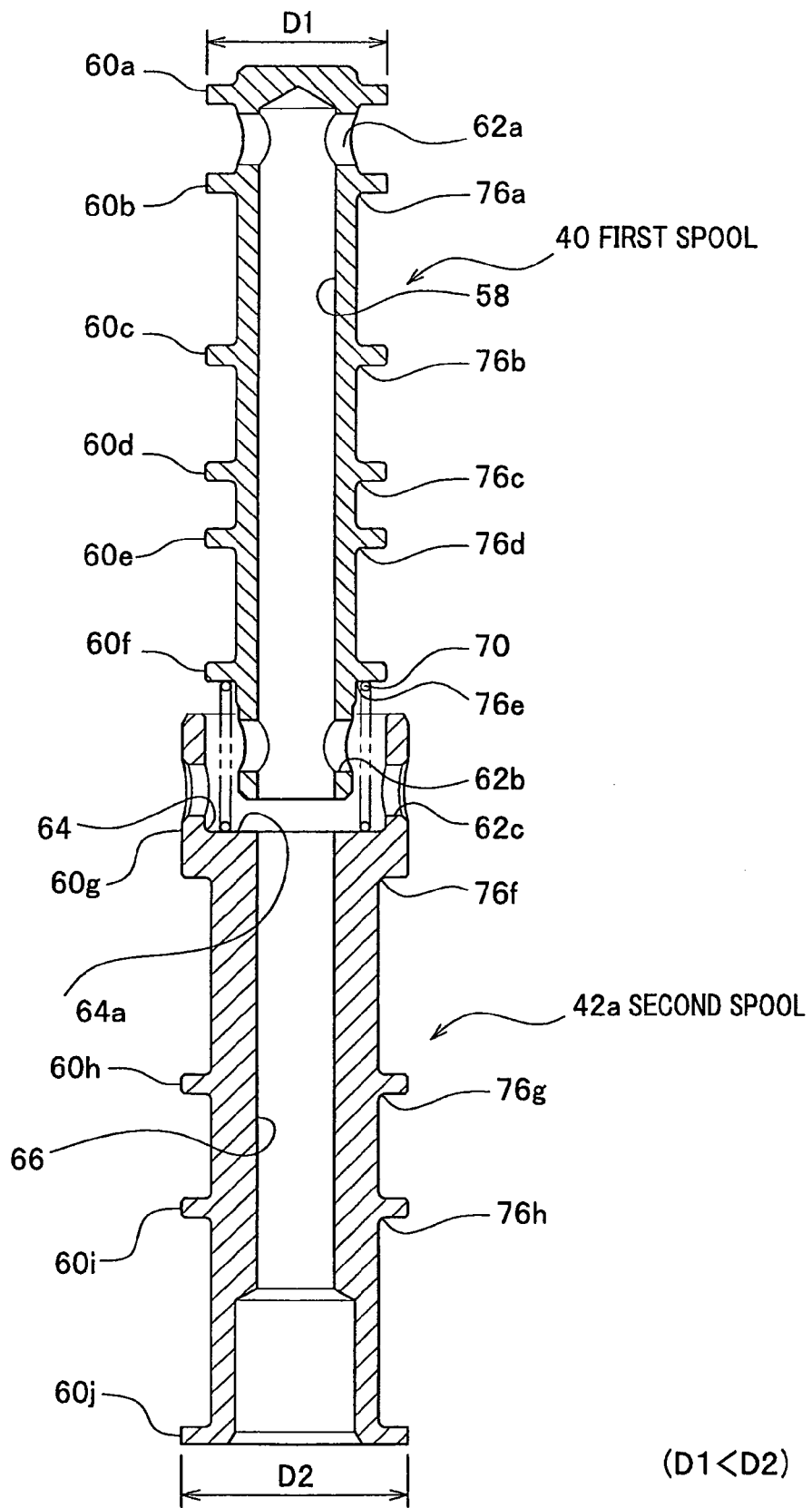
FIG. 18 is an enlarged longitudinal section view of the first and the second spools in the axial direction of the electromagnetic spool valve of FIG. 14.
Figure 19:
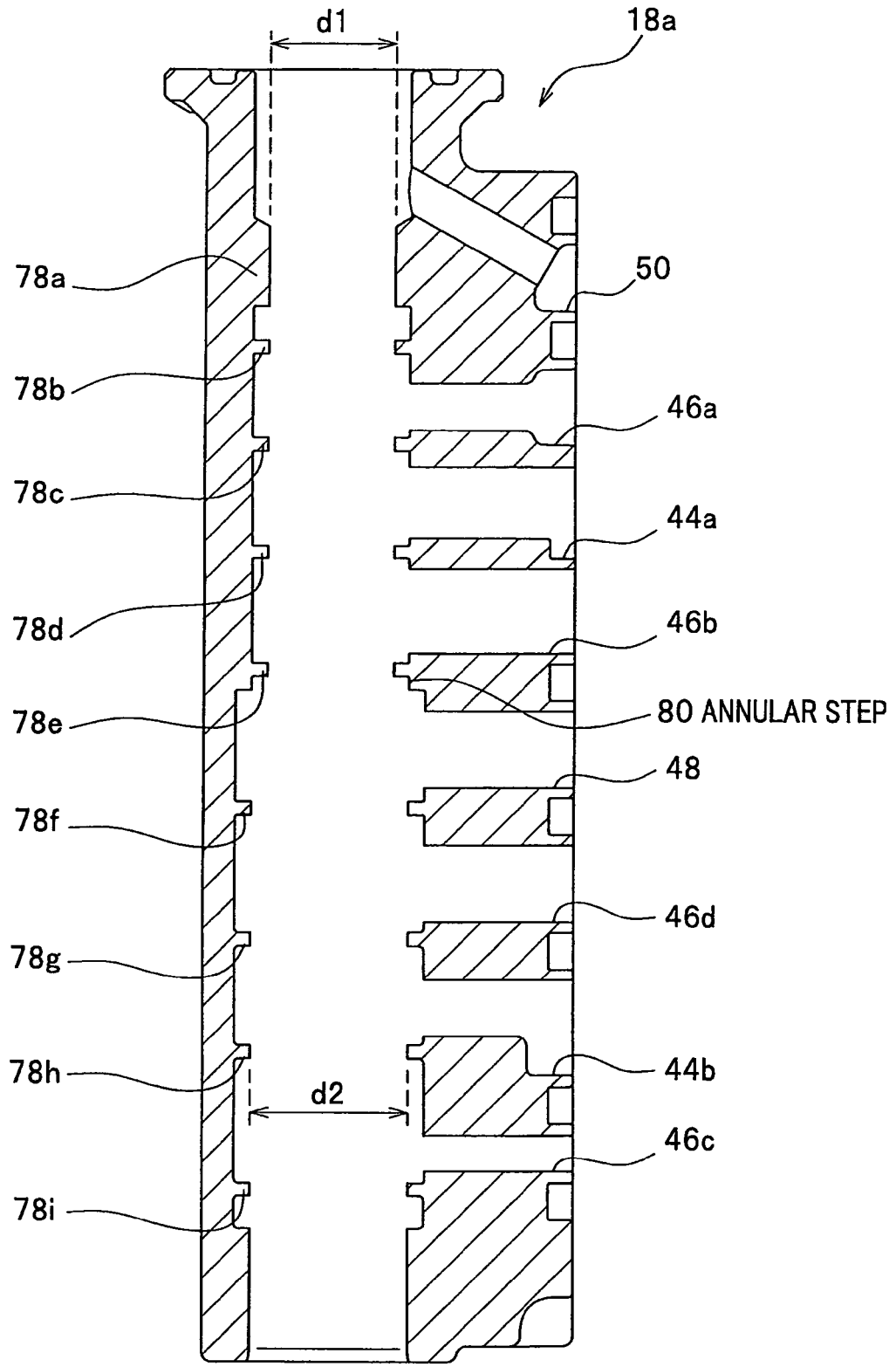
FIG. 19 is an enlarged longitudinal section view of the valve body in the axial direction of the electromagnetic spool valve of FIG. 14.

The first spool 40 and the second spool 42*a* are formed respectively of a separate cylindrical component, each of which is axially disposed in the inner space 52 of the valve body 18*a*. At this time, as shown in FIG. 18, the maximum outer diameter D2 of the second spool 42*a* (i.e. the outer diameter from the seven land 60*g* to the tenth land 60*j*, described later) is set to be larger than the maximum outer diameter D1 of the first spool 40 (i.e. the outer diameter of the first land 60*a* to the sixth land 60*f*) (D1<D2).

The first inlet port 44*a* and the second inlet port 44*b* are connected to the not-shown hydraulic pressure source (pressure fluid supplying source) such as a hydraulic pump via the oil supply passage, and the first outlet port 46*a* to the fourth outlet port 46*d* are connected to the hydraulic operational section of the not-shown hydraulic equipment via the output oil passage, and the drain port 48 is connected to the not-shown reservoir tank. This another embodiment is explained by using pressure oil, but is not limited to this, and pressure fluid including compressed air or the like may be used as the operational media.

The outer conferential surface of the first spool 40 has annular projections referred to lands, radically extending outwards with a predetermined length, and the first land 60*a* to the sixth land 60*f* are arranged in the axial direction in order from the linear solenoid section 12 side toward the cap member 68 side. The first land 60*a* to the sixth land 60*f* have an identical outer diameter, constituting the maximum outer diameter D1 of the first spool 40.

Figure 17:
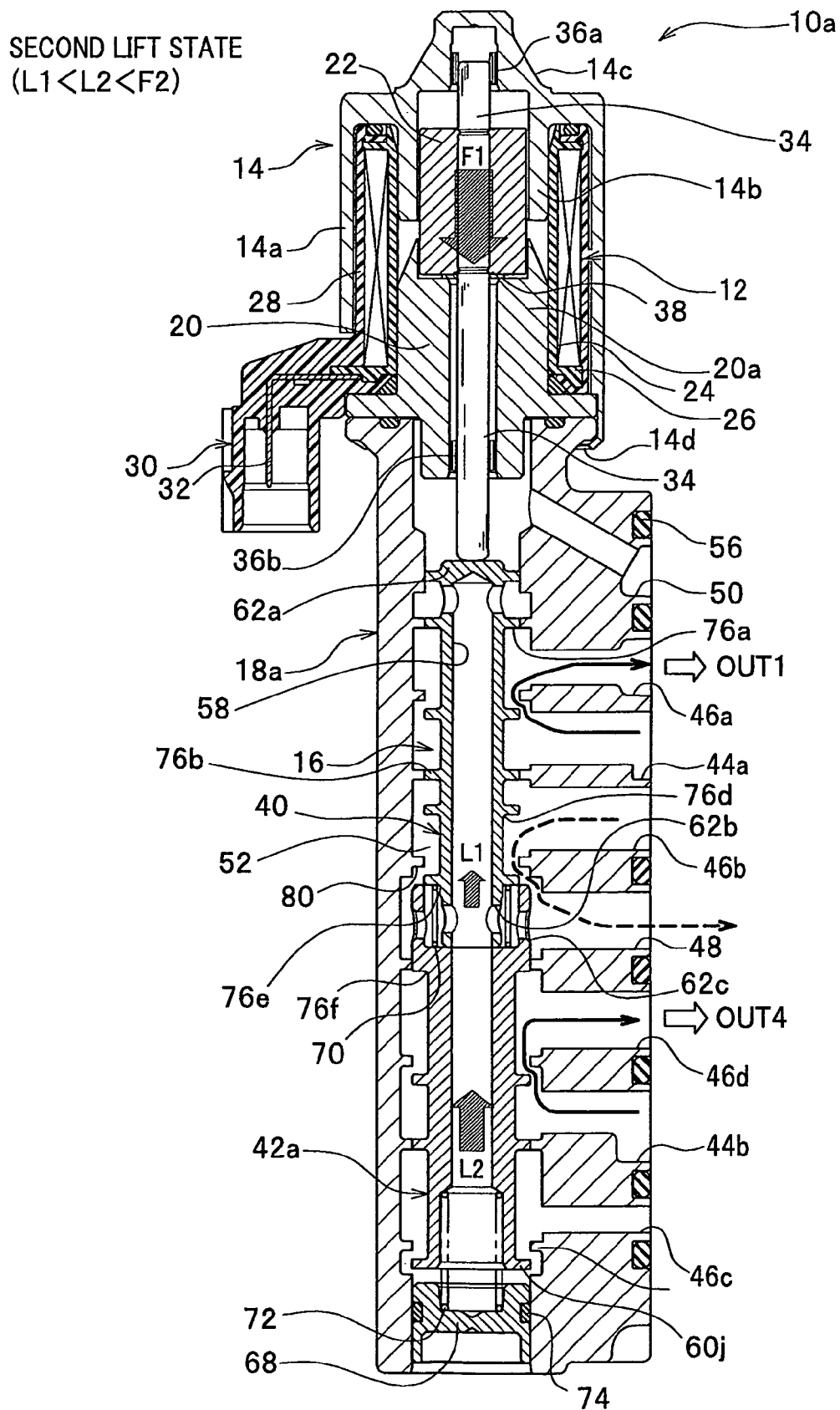
FIG. 17 is a longitudinal section view of the second lift state of the linear solenoid section of the valve of FIG. 14 for which moderate current is supplied for the first state thereof, so as to switch the valve position.

At this time, the second land 60*b* and the third land 60*c* of the first spool 40, adjacent to each other, form therebetween the first annular recessed portion 76*a* that communicates the first inlet port 44*a* with the first outlet port 46*a* (see the second lift state of FIG. 17). The third land 60*c* and the fourth land 60*d* of the first spool 40, adjacent to each other, form therebetween the second annular recessed portion 76*b* that communicates the first inlet port 44*a* with the first outlet port 46*a* (see the off state of FIG. 14 and the valve-initial state of FIG. 15 of the linear solenoid section).

Figure 15:
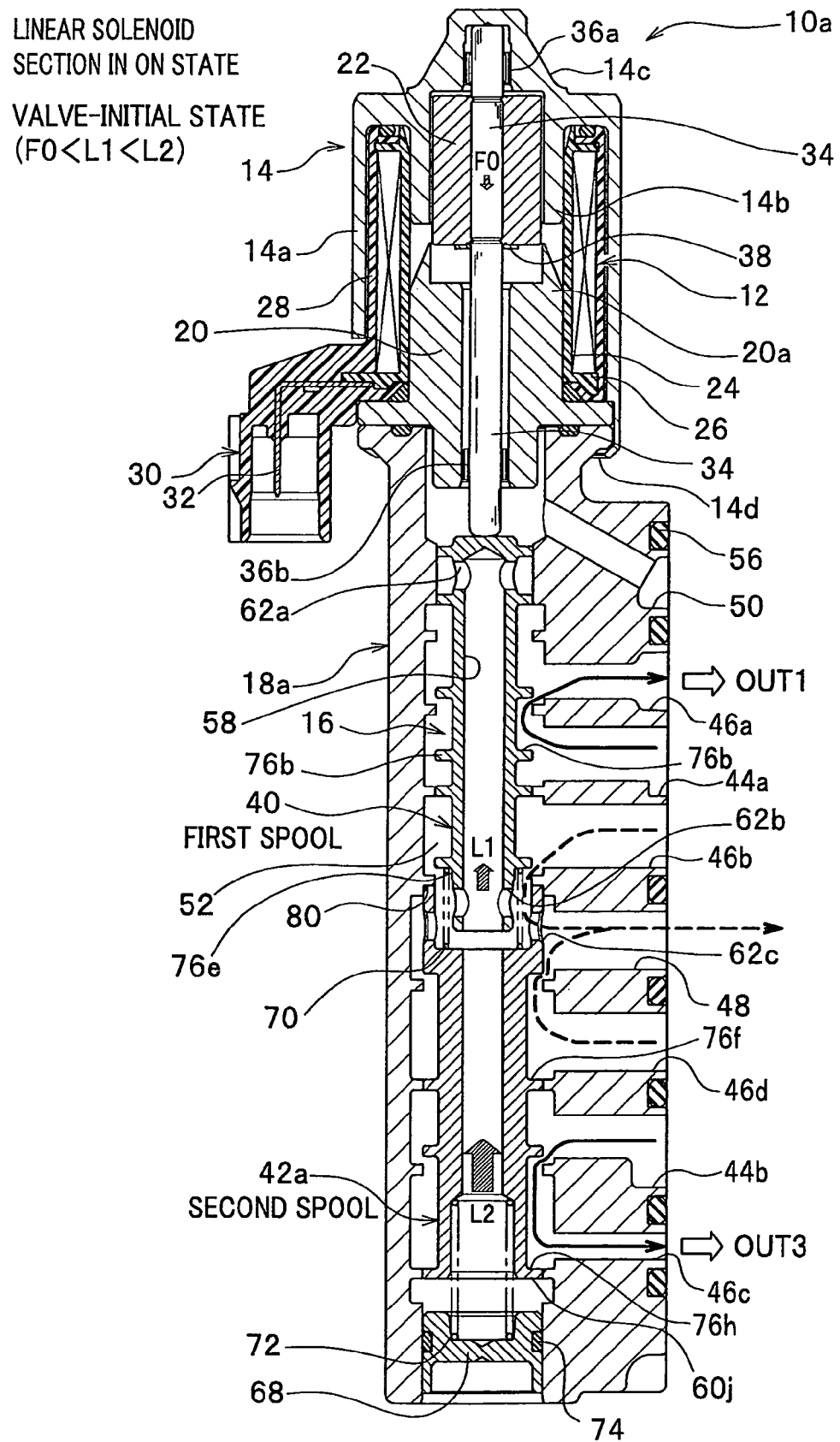
FIG. 15 is a longitudinal section view of the valve of FIG. 14 showing the valve-initial state of the linear solenoid section for which small current is supplied for the off state thereof.
Figure 16:
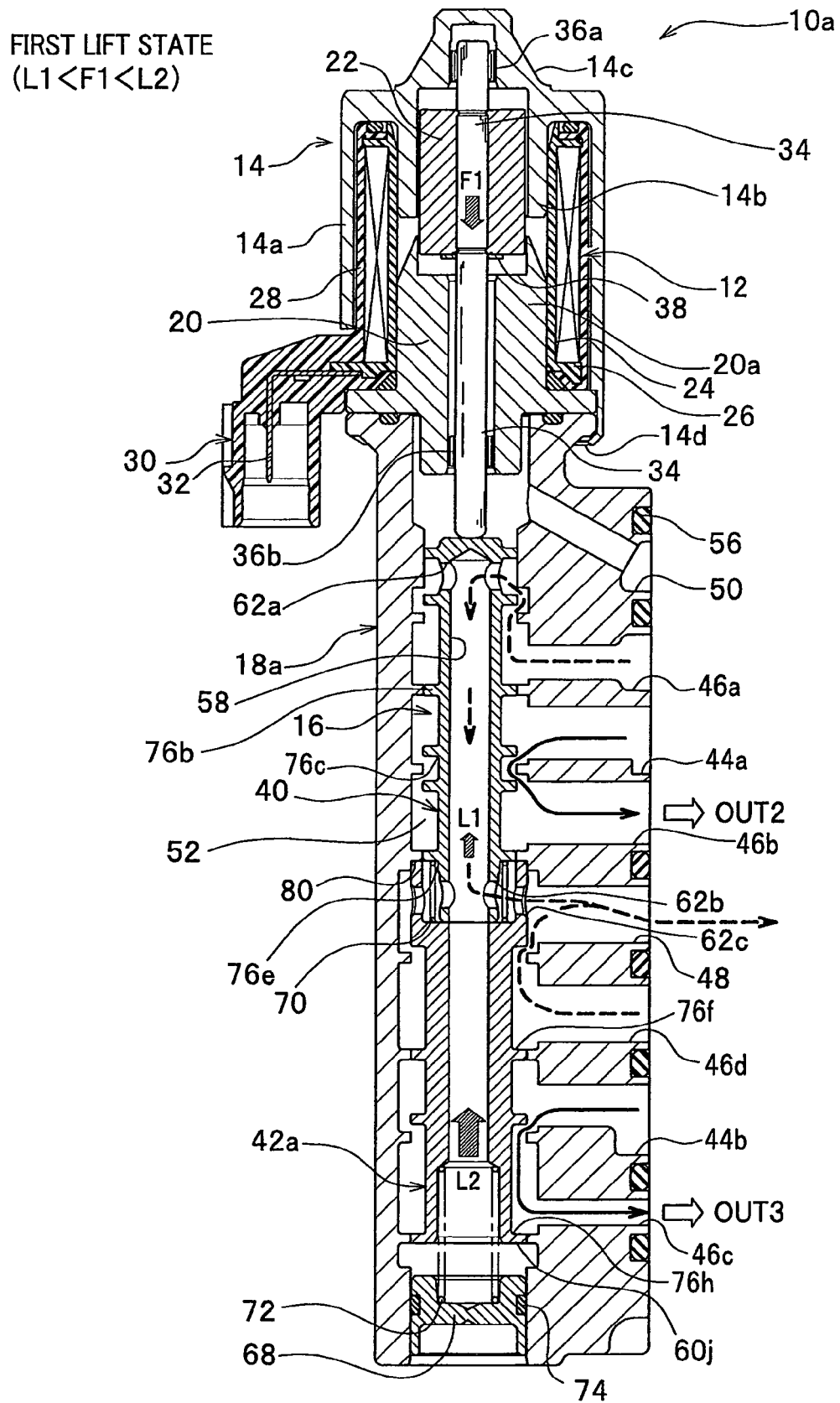
FIG. 16 is a longitudinal section view of the first lift state of the linear solenoid section of the valve of FIG. 14 for which moderate current is supplied for the valve-initial state thereof, so as to switch the valve position.

The fourth land 60*d* and the fifth land 60*e* of the first spool 40, which are adjacent to each other, form therebetween the third annular recessed portion 76*c* that communicates the first inlet port 44*a* with the second outlet port 46*b* (see the first lift state of FIG. 16). Furthermore, the fifth land 60*e* and the sixth land 60*f* of the first spool 40, which are adjacent to each other, form therebetween the fourth annular recessed portion 76*d* that communicates the second outlet port 46*b* with the drain port 48 (see the second lift state of FIG. 17). Yet, furthermore, the sixth land 60*f* and the lower end of the first spool 40 form therebetween the fifth annular recessed portion 76*e* that communicates the second outlet port 46*b* with the drain port 48 (see the off state of the FIG. 14 and the valve-initial state of FIG. 15).

In the upper end of the second spool 42*a* in vicinity of the first spool 40, there is provided the depressed portion 64 having an appropriate depth in the axial direction, and one end of the first spring member 70 is locked to the bottom wall surface 64*a* of the depressed portion 64, and the other end of the first spring member 70 is locked to the side wall of the sixth land 60*f* of the first spool 40. At this time, the inner diameter of the depressed portion 64 of the second spool 42*a* is set to be greater than that of the lower end of the first spool 40. The lower end of the first spool 40 is inserted into the depressed portion 64 of the second spool 42*a* with the first spring member 70 depressed, thus comes in contact with and abuts the bottom wall surface 64*a* of the depressed portion 64.

With reference to FIG. 18, there are projected provided the seventh land 60*g* and the eighth land 60*h* around the outer circumference of the second spool 42*a* with a wider width along the axial direction, the eighth land 60*h* to the tenth land 60*j* with a narrower width along the axial direction, all radically extending outwards. At this time, the seventh land 60*g* and the eighth land 60*h* form therebetween the sixth annular recessed portion 76*f* that communicates the second inlet port 44*b* with the fourth outlet port 46*d* (see the second lift state of FIG. 17), and the eighth land 60*h* and the ninth land 60*i* form therebetween the seventh annular recessed portion 76*g*.

Figure 14:
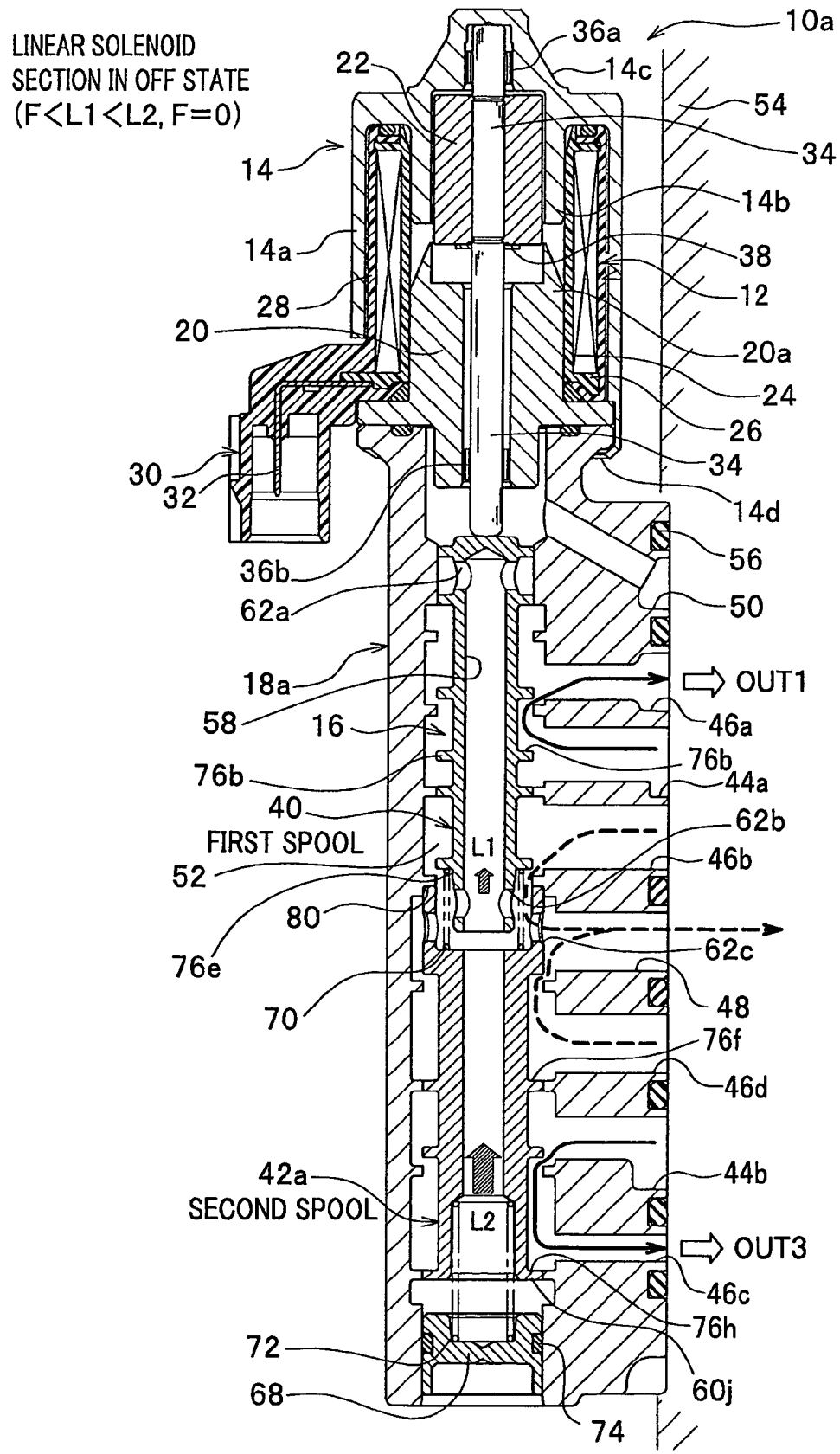
FIG. 14 is a longitudinal section view of the electromagnetic spool valve in the axial direction thereof, according to another embodiment of the present invention.

In addition, the ninth land 60*i* and the tenth land 60*j* of the second spool 42*a* form therebetween the eighth recessed portion 76*h* that communicates the second inlet port 44*b* with the third outlet port 46*c* (see the off state of FIG. 14, the valve initial state of FIG. 15, and the first lift state of FIG. 16 of the linear solenoid section, respectively). As shown in FIGS. 14 and 15, the sixth annular recessed portion 76*f* also functions for communicating the fourth outlet port 46*d* with the drain port 48.

Around the inner wall of the valve body 18*a*, there are provided the first annular projection 78*a* with a wider width in the axial direction, projecting toward the inner space 52, and also the second annular projection 78*a* to the ninth annular projection 78*i* each having a narrower width in the axial direction at a predetermined distance therebetween, in order from the linear solenoid section 12 side to the cap member 68 side.

As mentioned above, the maximum outer diameter D1 of the first spool 40 and the maximum outer diameter D2 of the second spool 42*a* are set to be different from each other, thus corresponding to the difference in maximum outer diameter of D1 and D2 (D1<D2), the first annular projection 78*a* to the fifth annular projection 78*e* have an inner diameter different from that of the sixth and the seventh annular projections 78*f*, 78*g* to the ninth annular projection 78*i*. Specifically, with reference to FIG. 9, on the boundary of the approximate center of the valve body 18*a*, the first annular projection 78*a* to the fifth annular projection 78*e* disposed on the housing 14 side are set to have a smaller inner diameter d1 than the inner diameter d2 of the sixth annular projection 78*f* to the ninth annular projections 78*i* disposed on the cap member 68 side (d1<d2).

Therefore, the inner diameter of the valve body 18*a* is configured to be smaller on the linear solenoid 12 side and greater on the cap member 68 side, thereby to facilitate various operations carried out from the greater outer diameter side, such as cutting of the inner space 52 and assembling the first and second spools 40, 42*a* and the like in the valve body 18*a*. Around a portion adjacent to the fifth annular projection 78*e* in the inner space 52 of the valve body 18*a*, there is provided an annular step 80 functioning as a stopper with which the upper end of the second spool 42*a* comes in contact and abuts when the linear solenoid section 12 is in the off state.

The electromagnetic spool valve 10*a* according to the present embodiment is constituted as mentioned above, and hereinafter descriptions will be provided on operations and operational effects of the electromagnetic spool valve 10*a*.

As shown in FIG. 14, when no current is supplied for the linear solenoid section 12, there is generated no electromagnetism (electromagnetic propulsion) of the linear solenoid section 12 (i.e. electromagnetic propulsion F=0), thus the first spool 40 is in a state of being pressed toward the linear solenoid section 12 side by the spring force (L1) of the first spring member 70, and the second spool 42*a* is in a state of being pressed toward the first spool 70 side by the spring force (L2) of the second spring member 72, so that the upper end of the second spool 42*a* comes in contact with and abuts the annular step 80, thereby to limit the second spool 42*a* to further displace toward the second spool 42*a* side.

As shown in FIG. 14, when the linear solenoid section 12 is in the off state, the second annular recessed portion 76*b* around the outer circumference surface of the first spool 40 communicates the first inlet port 44*a* with the first outlet port 46*a*, so that pressure oil fed from the first inlet port 44*a* is supplied via the second annular recessed portion 76*b* and the first outlet port 46*a* (OUT1) to other members 54. In the off state of the linear solenoid section 12, the eighth annular recessed portion 76*h* around the outer circumference surface of the second spool 42*a* lets the second inlet port 44*b* in communication with the third outlet port 46*c*, so that the pressure oil led from the second inlet port 44*b* is supplied via the eighth annular recessed portion 76*h* and the third outlet port 46*c* (OUT3) to the other members 54.

In another embodiment, in the off state of the linear solenoid section 12, the pressure oil is supplied for the other members 54 through two ports of the first outlet port 46*a* (OUT1) and the third outlet port 46*c* (OUT3).

In the off state of the linear solenoid section 12, as shown in FIG. 14, the first spool 40 and the second spool 42*a* are positioned such that the lower end portion of the first spool 40 and the upper end portion of the second spool 42 are overlapped by each other. Therefore, the second outlet port 46*b* is in communication with the drain port 48 via the fifth annular recessed portion 76*e* of the first spool 40, so that residual pressure oil in the second outlet port 46*b* is discharged from the drain port 48. In addition, the fourth outlet port 46*d* is in communication with the drain port 48 via the sixth annular recessed portion 76*f* of the second spool 42*a*, so that residual pressure oil in the fourth outlet port 46*d* is discharged from the drain port 48.

In this way, when the linear solenoid section 12 is in the off state, the spring load L1 of the first spring member 70 is set to be smaller than the spring load L2 of the second spring member 72, and the electromagnetic propulsion F of the linear solenoid section 12 is zero, which is smaller than the spring load L1 of the first spring member 70, thus the movable core 22 is located at the base position, the uppermost end position of the movable core 22 (F<L1<L2, F=0).

Next, the linear solenoid section 12 comes in the valve-initial state when being supplied with small current of a predetermined value (e.g. very small current), using an appropriate current value switching device (e.g. a not shown driver controlled with control signals sent from a control system to supply current for the coil so as to urge the coil 26). However, in this valve-initial state, as shown in FIG. 15, even if small current is supplied for the linear solenoid section 12 in the off state, the first and second spools 40, 42*a* never displace, thus in this valve-initial state, the valve position is still maintained to be equal to the off state of the linear solenoid section 12.

Specifically, in this valve-initial state, although a very small electromagnetic propulsion F0 is generated by small current for the linear solenoid section 12, this F0 is set to be smaller than the spring load L1 of the first spring member 70 and the spring load L2 of the second spring member 72: i.e. F0<L1<L2. Accordingly, in the valve-initial state in which the electromagnetic propulsion F0 generated in the linear solenoid section 12 is set to be smaller than the first spring load L1 and the second spring load L2, no driving force is transmitted to the first and second spools 40, 42*a*, so that the first and second spools 40, 42*a* remain at the valve position equal to the off state of the linear solenoid section 12. The base position state where the movable core 22 stays in its base position includes both the off state of the linear solenoid section 12 and the initial-valve state in which small current is supplied for the linear solenoid section 12.

Next, when the current value (I) is controlled by the current value switching device to supply moderate current for the linear solenoid section 12 so that the linear solenoid section 12 comes into the first lift state. In this first lift state, as shown in FIG. 16, due to electromagnetism (electromagnetic propulsion F1) in proportion to the current value supplied to the coil 26, the movable core 22 is attracted toward the fixed core 20 side, and stops at the intermediate position.

Specifically, displacement of the movable core 22 and the shaft 34 is transmitted to the first spool 40, the first spool 40 displaces toward the second spool 42*a* side while moving against the spring force (L1) of the first spring member 70, and then the lower end of the first spool 40 comes in contact with and abuts the bottom surface 64*a* of the depressed portion 64 of the second spool 42*a*, where the displacement of the first spool 40 is limited.

As shown in FIG. 16, when the third land 60*c* of the first spool 40 comes in contact with the third annular projection 78*c* of the valve body 18*a*, the first inlet port 44*a* comes out of communication with the first outlet port 46*a*, and at the same time, the third annular recessed portion 76*c* around the outer circumference of the first spool 40 lets the first inlet port 44*a* in communication with the second outlet port 46*b*. Accordingly, the pressure oil led from the first inlet port 44*a* is supplied via the third annular recessed portion 76*c* and the second outlet port 46*b* (OUT2) to the other members 54.

At the same time, in the first lift state, the eighth annular recessed portion 76*h* around the outer circumference surface of the second spool 42*a* lets the second inlet port 44*b* in communication with the third outlet port 46*c*, so that the pressure oil led from the second inlet port 44*b* is supplied via the eighth annular recessed portion 76*h* and the third outlet port 46*c* (OUT3) to the other members 54.

In further another embodiment, in the first lift state, the pressure oil is supplied for the other members 54 through two ports (OUT2 and OUT3) of the second outlet port 46*b* (OUT2) and the third outlet port 46*c* (OUT3).

While the lower end portion of the first spool 40 and the upper end portion of the second spool 42*a* are being overlapped by each other, the second through hole 62*b* of the first spool 40 laps with the third through hole 62*c* of the second spool 42*a* in the approximately horizontal direction. Thus, as shown in FIG. 16, the first outlet port 46*a* comes in communication with the drain port 48, via the first through hole 62*a*, the long hollow 58, the second through hole 62b of the first spool 40, and the third through hole 62c of the second spool 42a, so that the residual pressure oil in the first outlet port 46a is preferably discharged from the drain port 48. The fourth outlet port 46d comes in communication with the drain port 48 via the sixth annular recessed portion 76f of the second spool 42a, so that the residual pressure oil in the fourth outlet port 46d is discharged from the drain port 48 (see the broken line of FIG. 16).

In the first lift state, the current value (I), which is switched to be moderate current, greater than the small current for the valve-initial state, is supplied for the linear solenoid section 12, and the electromagnetic propulsion F1 greater than the spring load L1 of the first spring member 70 but smaller than the spring load L2 of the second spring member 72 is generated in the linear solenoid section 12, so that the movable core 22 is stopped at the intermediate position (L1<F1<L2). Hence, the electromagnetic propulsion F1 generated in the linear solenoid 12 can push and displace the first spool 40, but cannot push and displace the second spool 42a.

As a result, in this first lift state, only the first spool 40 is displaced and comes in contact with the second spool 42a so that the displacement of the first spool 40 is limited, meanwhile the second spool 42a stays at its original position.

According to this another embodiment, small current has been supplied in advance for the linear solenoid section 12 at the time of shifting from the valve-initial state to the first lift state, which realizes more quick shift from the valve-initial state to the first lift state, in comparison with a case of shifting from the off state with no current supplied for the linear solenoid section 12 (see FIG. 14) to the first lift state (see FIG. 16), thus reducing at minimum the valve operation delay when executing the switching control, resulting in enhancement of the valve operation response.

In other words, the present embodiment provides a standby stage of supplying small current for the linear solenoid section 12 (the valve-initial state) between the off state (see FIG. 14) and the first lift state (see FIG. 16), without directly shifting from the off state to the first lift state of the linear solenoid section 12. This realizes a preferable wave form of a pulse signal's initial rise at the time of switching the current value, thus enhancing response performance of the valve operation.

Next, the current value (I) is switched and controlled by the not-shown current value switching device to supply predetermined great current greater than the moderate current, for the linear solenoid section 12, so as to come into the second lift state. As shown in FIG. 17, in the second lift state, electromagnetic force (the electromagnetic propulsion F2) in proportion to the current value flowing to the coil 26 further attracts the movable core 22 toward the fixed core 20 side, and then the movable core 22 stops at the lowermost position (also referred to as a "displacement terminal position").

Specifically, further displacement of the movable core 22 and the shaft 34 is transmitted through the first spool 40 to the second spool 42a, and the second spool 42a is displaced toward the cap member 68 side while moving against the spring force (L2) of the second spring member 72.

At this time, as shown in FIG. 17, the fourth land 60d of the first spool 40 and the fourth annular projection 78d of the valve body 18a come in contact with each other, thereby to set the first inlet port 44a out of communication with the second outlet port 46b, and the first annular recessed portion 76a around the outer circumference surface of the first spool 40 switches the valve position to communicate the first inlet port 44a with the first outlet port 46a. At the same time, the second inlet port 44b and the fourth outlet port 46d come in communication with each other via the sixth annular recessed portion 76f around the outer circumference surface of the second spool 42a.

As a result, the pressure oil led from the first inlet port 44a is supplied via the first annular recessed portion 76a and the first outlet port 46a (OUT1) for the other members 54, and similarly, the pressure oil led from the second inlet port 44b is supplied via the sixth annular recessed potion 76f and the fourth outlet port 46d (OUT4) for the other members 54.

According to this another embodiment, in the second lift state, the pressure oil is supplied for the other members 54 through two ports (OUT1 and OUT4) of the first outlet port 46a (OUT1) and the fourth outlet port 46d (OUT4).

The second outlet port 46b comes in communication via the fourth annular recessed portion 76d with the drain port 48, thus the residual pressure oil in the second outlet port 46b is preferably discharged from the drain port 48 (see the broken line of FIG. 17).

At this time, as shown in FIG. 7, the upper end face of the second spool 42a and the side wall face of the sixth land 60f formed near the lower end portion of the first spool 40 has an approximately identical height H (see FIG. 7), thereby to smoothen pressure oil flow from the second outlet port 46b to the drain port 48.

Since the second spool 42a is provided with the stepped through hole 66 extending along the axial direction, pressure oil remains between the upper end of the second spool 42a and the cap member 68 is preferable discharged via the stepped through hole 66, the second through hole 62b and the third through hole 62c to the drain port 48.

In the second lift state, the current value (I) is switched from the moderate current of the first lift state to the great current of the second lift state, in which the electromagnetic propulsion F2, greater than not only the spring load L1 of the first spring member 40 but also the spring load L2 of the second spring member 42s, is generated in the linear solenoid section 12, so that the movable core 22 stops at the lowermost end position (i.e. displacement terminal position) (L1<L2<F2). Hence, the electromagnetic propulsion F2 generated in the linear solenoid section 12 pushes the first and second spools 40, 42a so as to displace them together almost at the same time.

In the second lift state, the electromagnetic propulsion F2 generated in the linear solenoid section 12 displaces the first and second spools 40, 42a coaxially while resisting the spring forces L1, L2 of the first and second spring members 70, 72, so that the first inlet port 44a and the first outlet port 46a come in communication with each other, and also the second inlet port 44b and the fourth outlet port 46d come in communication with each other, thereby to supply the pressure oil via the first outlet port 46a (OUT1) and the fourth outlet port 46d (OUT4) for the other members 54.

As described above, the present embodiment secures highly accurate three-state switching control, which includes: (1) the off state (see FIG. 14) and the valve-initial state (see FIG. 15) with small current supplied for the linear solenoid section 12, (2) the first lift state (see FIG. 16) with moderate current supplied for the linear solenoid section 12, and (3) the second lift state (see FIG. 17) with great current supplied for the linear solenoid section 12.

In addition, this another embodiment provides the three state switching control among four ports (the first outlet port 46a to the fourth outlet port 46d) through which oil pressure is supplied for the other members 54; for example, pressure oil is supplied for the other members 54 from the first and third outlet ports 46a and 46c in the off state and the initial valve state, from the second and the third outlet ports 46b and 46c in the first lift state, and from first and fourth outlet ports 46a to 46d in the second lift state, thus a number of various equipments may be used as the other members 54, resulting in enhancement of flexibility in design.

This another embodiment provides only the single common drain port 48 for four ports of the first to fourth outlet ports 46a to 46d, thus less number of the drain ports 48 may be required in comparison to a conventional case (requires two or more drain ports if there are four output ports, for example).

Further, in this another embodiment, the first spool 40 and the second spool 42a are positioned such that the lower end portion of the first spool 40 and the upper end portion of the second spool 42a are overlapped by each other, thus the axial length of the drain port 48 can be reduced so that the axial length of the valve body 18 can further be reduced.

The detailed descriptions of the embodiments of the present invention have been provided as mentioned above, and the present invention provides a three-state switching control on pressure of pressure fluid in a highly accurate manner, which includes the off state of the linear solenoid section, the first and the second lift states with current supplied for the linear solenoid section.

In addition, the present invention may include, as the plural ports of the valve body, at least the first inlet port, the second inlet port, the first outlet port, the second outlet port and the third outlet port.

According to the present invention, since the maximum outer diameter of the first spool (D1) and the maximum outer diameter of the second spool (D2) are set to be different from each other, the valve body has different inner diameters corresponding to this difference. Thus, the inner diameter of the valve body is configured to be smaller on the linear solenoid section side, and greater on one end of the valve body side, which facilities cutting operation of the inner space of the valve body as well as assemble operation of first spool and the second spool from the greater diameter side thereof.

In the assemble operation, the second spool inserted from the greater diameter of the valve body is positioned at a predetermined position in the inner space of the valve body by coming in contact with and abutting the annular step formed on the inner wall surface of the valve body, thereby to simplify the assemble operation to enhance the assembling performance.

Further, according to the present invention, there is provided a three-state switching control on pressure of pressure fluid in a highly accurate manner, which includes the valve-initial state with small current supplied for the linear solenoid section in the off state, the first lift state with moderate current greater than the small current supplied for the linear solenoid section so as to let the movable core positioned at the intermediate position, and the second lift states with great current greater than the moderate current supplied for the linear solenoid section so as to let the movable core positioned at the displacement terminal position.

The above-mentioned configuration enables a quicker shift from the valve-initial state to the first lift state when displacement is carried out from the valve-initial state to the first lift state because small current is supplied for the linear solenoid section in advance, in comparison to the case of shifting from the off state with no current supplied for the linear solenoid to the first lift state. Accordingly, it is possible to reduce at minimum the valve operation delay when executing the switching control, resulting in enhancement of the valve operational response (e.g. a preferable wave form of a pulse signal's initial rise at the time of switching the current value).

In addition, according to the present invention, the first and the second spools are positioned coaxially in series in the inner space of the valve body as described above, thereby to provide a three-state switching control on pressure of pressure fluid in a highly accurate manner, which includes the off state and the valve-initial state of the linear solenoid section, the first lift state with moderate current supplied for the linear solenoid section and the second lift state with great current supplied for the linear solenoid section.

The present invention provides the first to the fourth outlet ports through which pressure fluid is led out, and provides a three-state switching control on pressure of pressure fluid among these four ports, which includes the three-state switching control includes the base position, the first lift state and the second lift state. Accordingly, the present invention provides a three-state switching control on pressure of pressure fluid (e.g. pressure oil) by using the first and the second spools, which is applicable to various pressure fluid equipments and devices, thereby to enhance the general purpose property.

Other operational effects are the same as those in the above embodiment, therefore, detailed description thereof will be omitted.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An electromagnetic spool valve comprising:
a main body including a valve body having plural ports through which pressure fluid flows in and out and a housing which is connected to one end of the valve body;
a linear solenoid section including a coil wound around a coil bobbin, a fixed core, and a movable core that is attracted toward the fixed core when electric current is supplied for the coil, each installed in the housing; and
a valve operating mechanism comprising a first spool and a second spool coaxially provided in inner space of the valve body so as to switch a state of communication and discommunication among the plural ports,
wherein the valve operation mechanism is provided with a first spring member between the first and second spools, and with a second spring member between one end of the valve body and the second spool such that a spring load of the second spring member is set to be greater than a spring load of the first spring member;
wherein the switching of the state of communication and discommunication among the plural ports is carried out by a three-state switching control including:
an off state with no electric current supplied for the linear solenoid section;
a first lift state with electric current supplied for the linear solenoid section, so as to let the movable core positioned at an intermediate position; and
a second lift state with electric current supplied for the linear solenoid section, so as to let the movable core positioned at a displacement terminal position; and
wherein the plural ports comprise at least a first inlet port, a second inlet port, a first outlet port, a second outlet port and a third outlet port;

in the off state of the linear solenoid section, the first inlet port and the first outlet port are in communication with each other, so as to lead pressure fluid out from the first outlet port;

in the first lift state, the first inlet port and the second outlet port are in communication with each other, so as to lead the pressure fluid out from the second outlet port; and in the second lift state, the first inlet port and the first outlet port are in communication with each other, so as to lead the pressure fluid out from the first outlet port, and the second inlet port and the third outlet port are in communication with each other, so as to lead the pressure fluid out from the third outlet port.

2. The electromagnetic spool valve according to the claim 1, wherein in the off state of the linear solenoid section, an electromagnetic propulsion generated in the linear solenoid section is zero, and the spring load of the first spring member is greater than the zero electromagnetic propulsion and smaller than the spring load of the second spring member;

in the first lift state of the linear solenoid section, the electromagnetic propulsion generated in the linear solenoid section is greater than the spring load of the first spring member, and is smaller than the spring load of the second spring member; and in the second lift state of the linear solenoid section, the electromagnetic propulsion generated in the linear solenoid section is greater than both the spring loads of the first and second spring members.

3. An electromagnetic spool valve comprising:

a main body including a valve body having plural ports through which pressure fluid flows in and out and a housing which is connected to one end of the valve body;

a linear solenoid section including a coil wound around a coil bobbin, a fixed core, and a movable core that is attracted toward the fixed core when electric current is supplied for the coil, each installed in the housing;

a valve operating mechanism comprising a first spool and a second spool coaxially provided in inner space of the valve body so as to switch a state of communication and discommunication among the plural ports; and a first spring member provided between the first and second spools, and a second spring member provided between one end of the valve body and the second spool, the second spool having a maximum outer diameter in approximately cylindrical shape, which is greater than a maximum outer diameter in approximately cylindrical shape of the first spool;

an annular stopper where one end of the second spool comes in contact and abuts being provided around an inner wall face of the valve body;

wherein the switching of a state of communication and discommunication among the plural ports is carried out by a three-state switching control including:

an off state with no electric current supplied for the linear solenoid section;

a first lift state with electric current supplied for the linear solenoid section, so as to let the movable core positioned at an intermediate position; and a second lift state with electric current supplied for the linear solenoid section, so as to let the movable core positioned at a displacement terminal position; and wherein the plural ports comprise at least a first inlet port, a second inlet port, a first outlet port, a second outlet port and a third outlet port;

in the off state of the linear solenoid section, the first inlet port and the first outlet port are in communication with each other, so as to lead pressure fluid out from the first outlet port;

in the first lift state of the linear solenoid section, the first inlet port and the second outlet port are in communication with each other, so as to lead the pressure fluid out from the second outlet port; and in the second lift state of the linear solenoid section, the first inlet port and the first outlet port are in communication with each other, so as to lead the pressure fluid out from the first outlet port, and the second inlet port and the third outlet port are in communication with each other, so as to lead the pressure fluid out from the third outlet port.

4. The electromagnetic spool valve according to the claim 3, wherein in the off state of the linear solenoid section, an electromagnetic propulsion generated in the linear solenoid section is zero, and the spring load of the first spring member is greater than the zero electromagnetic propulsion and smaller than the spring load of the second spring member;

in the first lift state of the linear solenoid section, the electromagnetic propulsion generated in the linear solenoid section is greater than the spring load of the first spring member, and is smaller than the spring load of the second spring member; and in the second lift state of the linear solenoid section, the electromagnetic propulsion generated in the linear solenoid section is greater than both the spring loads of the first and second spring members.

* * * * *